US010305659B2

(12) United States Patent
Chu et al.

(10) Patent No.: US 10,305,659 B2
(45) Date of Patent: May 28, 2019

(54) UPLINK MULTI-USER TRANSMISSION

(71) Applicant: Marvell World Trade Ltd., St. Michael (BB)

(72) Inventors: Liwen Chu, San Ramon, CA (US); Lei Wang, San Diego, CA (US); Jinjing Jiang, San Jose, CA (US); Hongyuan Zhang, Fremont, CA (US); Yakun Sun, San Jose, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 20 days.

(21) Appl. No.: 15/486,186

(22) Filed: Apr. 12, 2017

(65) Prior Publication Data
US 2017/0294992 A1 Oct. 12, 2017

Related U.S. Application Data

(60) Provisional application No. 62/332,972, filed on May 6, 2016, provisional application No. 62/321,703, filed on Apr. 12, 2016.

(51) Int. Cl.
*H04W 4/00* (2018.01)
*H04L 5/00* (2006.01)
(Continued)

(52) U.S. Cl.
CPC ............ *H04L 5/005* (2013.01); *H04L 5/0007* (2013.01); *H04W 72/0413* (2013.01); *H04W 72/0446* (2013.01); *H04W 84/12* (2013.01)

(58) Field of Classification Search
CPC ... H04L 1/0001; H04L 1/0028; H04L 1/1671; H04L 5/0007; H04L 5/005;
(Continued)

(56) References Cited

U.S. PATENT DOCUMENTS 6,862,440 B2  3/2005  Sampath
7,206,354 B2  4/2007  Wallace et al.
(Continued)

FOREIGN PATENT DOCUMENTS

WO  WO-2012/122119  9/2012

OTHER PUBLICATIONS

Ansari et al., "Unified MIMO Pre-Coding Based on Givens Rotation," The Institute of Electrical and Electronics Engineers, doc. No. IEEE C802.16e-04/516r2, pp. 1-13, (Jan. 11, 2005).
(Continued)

*Primary Examiner* — Frank Duong

(57) ABSTRACT

A method for transmitting a subchannel availability for an uplink (UL) multi-user (MU) transmission is described. An availability of one or more subchannels of an orthogonal frequency division multiplex (OFDM) channel are determined by a first communication device for the UL MU transmission. A High Throughput (HT) Control field of a media access control (MAC) header that includes an indication of the determined availability of the one or more subchannels is generated by the first communication device. A MAC protocol data unit (MPDU) that includes the HT Control field is generated by the first communication device. The MPDU is transmitted by the first communication device to a second communication device via the OFDM channel for a subsequent allocation of radio resources for the UL MU transmission by the second communication device.

22 Claims, 15 Drawing Sheets

(51) Int. Cl.
*H04W 72/04* (2009.01)
*H04W 84/12* (2009.01)

(58) Field of Classification Search
CPC ............. H04L 27/2602; H04L 27/2607; H04L 27/2613; H04L 69/22; H04L 27/26; H04W 72/04; H04W 72/0446; H04W 72/12; H04W 72/121; H04W 72/1289; H04W 76/04; H04W 80/02; H04W 84/12
See application file for complete search history.

(56) References Cited

U.S. PATENT DOCUMENTS

| | | | |
|---|---|---|---|
| 7,486,740 B2 | 2/2009 | Inanoglu | |
| 7,599,332 B2 | 10/2009 | Zelst et al. | |
| 7,729,439 B2 | 6/2010 | Zhang et al. | |
| 7,742,390 B2 | 6/2010 | Mujtaba | |
| 8,068,455 B2 | 11/2011 | Utsunomiya et al. | |
| 8,155,138 B2 | 4/2012 | van Nee | |
| 8,270,909 B2 | 9/2012 | Zhang et al. | |
| 8,339,978 B2 | 12/2012 | Sawai et al. | |
| 8,363,578 B1 | 1/2013 | Ramamurthy et al. | |
| 8,526,351 B2 | 9/2013 | Fischer et al. | |
| 8,599,804 B2 | 12/2013 | Erceg et al. | |
| 8,619,907 B2 | 12/2013 | Mujtaba et al. | |
| 8,670,399 B2 | 3/2014 | Liu et al. | |
| 8,724,720 B2 | 5/2014 | Srinivasa et al. | |
| 8,737,405 B2 | 5/2014 | Liu et al. | |
| 8,787,338 B2 | 7/2014 | Liu et al. | |
| 8,787,385 B2 | 7/2014 | Liu et al. | |
| 8,811,203 B1 | 8/2014 | Liu et al. | |
| 8,867,653 B2 | 10/2014 | Zhang et al. | |
| 8,923,118 B1 | 12/2014 | Liu et al. | |
| 8,948,283 B2 | 2/2015 | Zhang | |
| 8,971,350 B1 | 3/2015 | Liu | |
| 9,088,908 B2 | 7/2015 | Liu | |
| 9,130,727 B2 | 9/2015 | Zhang et al. | |
| 9,900,878 B2* | 2/2018 | Seok ................... | H04W 72/042 |
| 2006/0063492 A1 | 3/2006 | Iacono et al. | |
| 2009/0196163 A1 | 8/2009 | Du | |
| 2010/0046656 A1 | 2/2010 | van Nee et al. | |
| 2010/0260159 A1 | 10/2010 | Zhang et al. | |
| 2011/0002219 A1 | 1/2011 | Kim et al. | |
| 2011/0268094 A1 | 11/2011 | Gong et al. | |
| 2012/0039196 A1 | 2/2012 | Zhang | |
| 2012/0294294 A1 | 11/2012 | Zhang | |
| 2012/0314653 A1 | 12/2012 | Liu | |
| 2013/0202001 A1 | 8/2013 | Zhang | |
| 2013/0229996 A1 | 9/2013 | Wang et al. | |
| 2014/0198692 A1 | 7/2014 | Torab Jahromi et al. | |
| 2014/0328235 A1 | 11/2014 | Merlin et al. | |
| 2015/0131517 A1 | 5/2015 | Chu et al. | |
| 2016/0014803 A1 | 1/2016 | Merlin et al. | |
| 2016/0080115 A1 | 3/2016 | Josiam et al. | |
| 2016/0227599 A1* | 8/2016 | Lee ....................... | H04L 1/0001 |
| 2016/0330788 A1 | 11/2016 | Zhang et al. | |
| 2016/0366254 A1* | 12/2016 | Asterjadhi ............ | H04L 69/324 |
| 2017/0170937 A1 | 6/2017 | Chun et al. | |
| 2017/0311310 A1 | 10/2017 | Ryu et al. | |
| 2018/0020460 A1* | 1/2018 | Hedayat .............. | H04L 27/2602 |

OTHER PUBLICATIONS

Cariou et al., "Multi-channel Transmissions," Doc. No. IEEE 802.11-09/1022r0, *The Institute of Electrical and Electronics Engineers, Inc.*, pp. 1-13 (Sep. 2009).

Chun et al. "Legacy Support on HEW frame structure," doc: IEEE 11-13/1057r0, *The Institute of Electrical and Electronics Engineers, Inc.*, pp. 1-8 (Sep. 2013).

De Vegt, "Potential Compromise for 802.11ah Use Case Document", Institute of Electrical and Electronics Engineers, doc. No. IEEE 802.11-11/0457r0, pp. 1-27 (Mar. 2011).

Fischer et al., "Link Adaptation Subfield for VHT," doc. No. IEEE 802.11-10/1095r0, IEEE 802.11-10, 123rd IEEE 802.11 Wireless Local Area Networks session, Interim Meeting Session, Hilton Waikoloa Village, pp. 1-5 (Sep. 12, 2010).

Hiertz et al., "The IEEE 802.11 Universe," IEEE Communications Magazine, pp. 62-70, (Jan. 2010).

IEEE P802.11ah™/D1.3 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-466 (Apr. 2014).

IEEE P802.11ax™/D0.5, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN (#1121)," IEEE Computer Society, 376 pages (Sep. 2016).

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).

IEEE Std 802.11ac™-2013 "IEEE Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-425 (Dec. 18, 2013).

IEEE Std 802.11ah™/D1.0 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-394 (Oct. 2013).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

IEEE Std 802.16™-2012 (Revision of IEEE Std. 802.16-2009), IEEE Standard for Air Interface for Broadband Wireless Access Systems: Part 1—Beginning through Section 7, IEEE Computer Society and the IEEE Microwave Theory and Techniques Society, *The Institute of Electrical and Electronics Engineers, Inc.*, 2558 pages (Aug. 17, 2012).

Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).

Kwon et al., "SIG Structure for UL PPDU," IEEE Draft, doc. IEEE 802.11-15/0574r0, vol. 802.11ax, 18 pages (May 11, 2015).

Liu et al., "VHT BSS Channel Selection," *Institute of Electrical and Electronics Engineers, Inc.*, doc. No. IEEE 802.11-11/1433r0, pp. 1-10 (Nov. 2011).

Love et al., "An Overview of Limited Feedback in Wireless Communication Systems," IEEE J. on Selected Areas in Communications, vo. 26, No. 8, pp. 1341-1365 (Oct. 2008).

(56) References Cited

OTHER PUBLICATIONS

Merlin et al., "Trigger Frame Format," IEEE Draft, doc. IEEE 802.11-15/0877r1, vol. 802.11ax, No. 1, 16 pages (Jul. 13, 2015).
Merlin et al., "VHT Control and Link Adaptation," doc. No. IEEE 802.11-11/0040r0, IEEE 802.22-11, 125th IEEE 802.11 Wireless Local Area Networks Session, Interim Meeting Session, Hyatt Century Plaza Hotel, Los Angeles, California, pp. 1-15 (Jan. 18, 2011).
Noh et al., "Channel Selection and Management for 11ac," Doc. No. IEEE 802.11-10/0593r1, *The Institute of Electrical and Electronics Engineers, Inc.*, pp. 1-21 (May 20, 2010).
Park et al., "Low Power Capability Support for 802.11ah," doc. No. IEEE 802.11-11/0060r1, *The Institute for Electrical and Electronics Engineers*, 7 pages (Jan. 17, 2011).
Park, "IEEE 802.11ac: Dynamic Bandwidth Channel Access," 2011 IEEE Int'l Conf. on Communications (ICC), pp. 1-5 (Jun. 2011).
Park, "Proposed Specification Framework for TGah D9.x", The Institute of Electrical and Electronics Engineers, doc. No. IEEE 802.11-yy/xxxxr0, pp. 1-30 (Jul. 2012).
Park, "Proposed Specification Framework for TGah", *The Institute of Electrical and Electronics Engineers*, doc. No. IEEE 802.11-yy/xxxxr05, pp. 1-12 (Jan. 2012).
Park, "Proposed Specification Framework for TGah", *The Institute of Electrical and Electronics Engineers*, doc. No. IEEE 802.11-11/1137r11, pp. 1-36 (Sep. 2012).
Park, "Proposed Specification Framework for TGah", *The Institute of Electrical and Electronics Engineers*, doc. No. IEEE 802.11-11/1137r6, pp. 1-13 (Mar. 2012).
Park, "Specification Framework for TGah," *The Institute of Electrical and Electronics Engineers*, doc. No. IEEE 802.11-11/1137r13, pp. 1-58 (Jan. 14, 2013).
Pedersen et al., "Carrier Aggregation for LTE-Advanced: Functionality and Performance Aspects," IEEE Communications Magazine, vol. 49, No. 6, pp. 89-95, (Jun. 1, 2011).
Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).
Redieteab et al., "Cross-Layer Multichannel Aggregation for Future WLAN Systems," 2010 IEEE Int'l Conf. on Communication Systems (ICCS), pp. 740-756 (Nov. 2010).
Seok et al., "HEW PPDU Format for Supporting MIMO-OFDMA," IEEE 802.11-14/1210r0, Sep. 14, 2014 (16 pages).
Shao, "Channel Selection for 802.11ah," doc.: IEEE 802.11-12/0816r0, pp. 1-11 (Jul. 2012).
Shi et al., "Phase Tracking During VHT-LTF," Doc. No. IEEE 802.11-10, 0771r0, *The Institute of Electrical and Electronics Engineers, Inc.*, pp. 1-19 (Jul. 2010).
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Stacey et al., "Specification Framework for TGac," document No. IEEE 802.11-09/0992r20, *Institute for Electrical and Electronics Engineers*, pp. 1-49, (Jan. 18, 2011).
Stacey, "Specification Framework for TGax," doc. IEEE 802.11-15/0132r12, vol. 802.11ax, No. 12, 38 pages (Dec. 1, 2015).
Syafei et al., "A Design of Next Generation Gigabit MIMO Wireless LAN System ," IEEE 12th Int'l Conference on Advanced Communication Technology (ICACT 2010), *The Institute of Electrical and Electronics Engineers*, pp. 941-946 (2010).
Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).
Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), *The Institute of Electrical and Electronics Engineers*, pp. 207-211 (2009).
Taghavi et al., "Introductory Submission for TGah", doc. No. IEEE 802.11-11/0062r0, *Institute for Electrical and Electronics Engineers*, pp. 1-5 (Jan. 14, 2011).
Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).
U.S. Appl. No. 14/961,359, Chu et al., "Basic Service Set Color Identifier," filed Dec. 7, 2015.
U.S. Appl. No. 15/019,768, Chu et al., "Orthogonal Frequency Division Multiple Access Resource Request," filed Feb. 9, 2016.
U.S. Appl. No. 15/442,398, Chu et al., "Resource Request for Uplink Multi-User Transmission," filed Feb. 24, 2017.
Van Zelst et al., "Pilot Sequence for VHT-DATA," Doc. No. IEEE 802.11-10/0811r1, *The Institute of Electrical and Electronics Engineers, Inc.*, pp. 1-10 (Jul. 2010).
Vermani et al. "Preamble Format for 1 MHz," *The Institute of Electrical and Electronics Engineers*, doc. No. IEEE 802.11-11/1482r2, pp. 1-30 (Nov. 2011).
Vermani et al. "Spec Framework Text for PHY Numerology," *The Institute of Electrical and Electronics Engineers*, doc. No. IEEE 802.11-11/1311r0, pp. 1-5 (Sep. 2011).
Wannstrom, "Carrier Aggregation explained," pp. 1-6 (May 2012).
Yu et al., "Coverage extension for IEEE802.11ah," *The Institute of Electrical and Electronics Engineers*, doc. No. IEEE 802.11-11/0035r1, pp. 1-10 (Jan. 2011).
Yuan et al., "Carrier Aggregation for LTE-Advanced Mobile Communication Systems," *IEEE Communications Magazine*, pp. 88-93 (Feb. 2010).
Zhang et al., "11 ac Explicit Sounding and Feedback", The Institute of Electrical and Electronics Engineers, doc. No. IEEE 802.11-10/1105r0, 44 pages (Sep. 2010).
Zhang et al., "11 ah Data Transmission Flow," *The Institute of Electrical and Electronics Engineer*, doc. No. IEEE 802.11-11/1484r1, pp. 1-15 (Nov. 2011).
Zhang et al., "1MHz Waveform in Wider BW", *The Institute of Electrical and Electronics Engineers*, doc. No. IEEE 802.11-12/0309r1, pp. 1-10 (Mar. 2012).
Zhang et al., "Beamforming Feedback for Single Stream," *The Institute of Electrical and Electronics Engineers*, doc. No. IEEE 802.11-12/1312r0, pp. 1-22 (Nov. 12, 2012).
Zhang et al., "VHT Link Adaptations," doc. No. IEEE802.11-11/0047r0, IEEE 802.11-11, 125th IEEE 802.11 Wireless Local Area Networks Session, Interim Meeting Session, Hyatt Century Plaza Hotel, Los Angeles, California, pp. 1-11 (Jan. 18, 2011).
International Search Report and Written Opinion in International Patent Application No. PCT/US2017/027214, dated Nov. 20, 2017 (16 pages).
Invitation to Pay Additional Fees and Partial International Search Report in International Patent Application No. PCT/US2017/027214, dated Sep. 28, 2017 (13 pages).
Asterjadhi et al., "HE A-Control field," IEEE Draft, IEEE 802.11-15/11211.0, vol. 802.11ax, 18 pages (Sep. 12, 2015).
Lv et al., "UL MU CCA Response," IEEE Draft, 802.11-16/0054r1, vol. 802.11ax, No. 1, 14 pages (Jan. 18, 2016).
Stacey et al., "IEEE P802.11 Wireless LANs—Proposed TGax draft specification," IEEE Draft, IIEEE 802.11-16/0024r1, vol. 802.11ax, No. 1, pp. 1-160 (Mar. 2, 2016).
Stacey, Robert, "IEEE P802.11 Wireless LANs—Specification Framework for TGax," IEEE Mentor Public Documentation Portal, retrieved from https://mentor.ieee.org/802.11/dcn/15/11-15-0132-15-00ax-spec-framework.docx on Jun. 8, 2017, p. 30, line 29-p. 32, line 19; p. 37, lines 28-42 (Jan. 28, 2016).
Notice of Allowance in U.S. Appl. No. 15/019,768, dated Jul. 20, 2017 (18 pages).

\* cited by examiner

FIG. 11A

| CONTROL ID (UL MU RESPONSE) | UL PPDU LENGTH | DL TX POWER | TARGET UL RX POWER | RU ALLOCATION | SSS |
|---|---|---|---|---|---|
| 4 | 5 | 5 | 5 | 8 | 3 |
| 1102 | 1104 | 1106 | 1108 | 1110 | 1112 |

1100

BIT LENGTH

FIG. 11B

| CONTROL ID (UL MU RESPONSE) | UL PPDU LENGTH | TARGET UL RX POWER | RU ALLOCATION | SSS | MCS |
|---|---|---|---|---|---|
| 4 | 5 | 5 | 8 | 3 | 3 |
| 1102 | 1104 | 1108 | 1110 | 1112 | 1152 |

1150

BIT LENGTH

FIG. 13A

| BIT LENGTH: | 4 | 1 | 5 | 5 | 5 | 3 | 3 |
|---|---|---|---|---|---|---|---|
| | CONTROL ID (UL MU RESPONSE) | OFDMA/MU-MIMO | UL PPDU LENGTH | DL TX POWER | TARGET UL RX POWER | SSS | MCS |
| | 1102 | 1302 | 1104 | 1106 | 1108 | 1112 | 1152 |

| BIT LENGTH: | 4 | 1 | 5 | 5 | 5 | 8 | 3 |
|---|---|---|---|---|---|---|---|
| | CONTROL ID (UL MU RESPONSE) | OFDMA/MU-MIMO | UL PPDU LENGTH | DL TX POWER | TARGET UL RX POWER | RU ALLOCATION | MCS |
| | 1102 | 1302 | 1104 | 1106 | 1108 | 1110 | 1152 |

1300

UPLINK MULTI-USER TRANSMISSION

CROSS REFERENCES TO RELATED APPLICATIONS

This application claims the benefit of U.S. Provisional Patent App. No. 62/321,703, entitled "HE Control Field Content," filed on Apr. 12, 2016, and U.S. Provisional Patent App. No. 62/332,972, entitled "HE Control Field Content—Scheduling Information for UL MU Response," filed on May 6, 2016, the disclosures of each of which are hereby expressly incorporated herein by reference in their entirety.

FIELD OF TECHNOLOGY

The present disclosure relates generally to wireless communication systems, and more particularly to uplink transmissions in wireless local area networks that utilize orthogonal frequency division multiplexing.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

SUMMARY

In an embodiment, a method for transmitting a subchannel availability for an uplink (UL) multi-user (MU) transmission includes determining, by a first communication device, an availability of one or more subchannels of an orthogonal frequency division multiplex (OFDM) channel for the UL MU transmission. The method also includes generating, by a first communication device, a High Throughput (HT) Control field of a media access control (MAC) header that includes an indication of the determined availability of the one or more subchannels. The method includes generating, by the first communication device, a MAC protocol data unit (MPDU) that includes the HT Control field. The method also includes transmitting, by the first communication device, the MPDU to a second communication device via the OFDM channel for a subsequent allocation of radio resources for the UL MU transmission by the second communication device.

In another embodiment, an apparatus for transmitting a subchannel availability for an UL MU transmission includes a network interface device associated with a first communication device and having one or more integrated circuits (ICs). The one or more ICs are configured to determine an availability of one or more subchannels of an OFDM channel for the UL MU transmission. The one or more ICs are further configured to generate a HT Control field of a MAC header that includes an indication of the determined availability of the one or more subchannels. The one or more ICs are configured to generate an MPDU that includes the HT Control field. The one or more ICs are further configured to transmit the MPDU to a second communication device via the OFDM channel for a subsequent allocation of radio resources for the UL MU transmission by the second communication device.

In an embodiment, a method for transmitting an UL OFDM data unit of an UL MU transmission includes receiving, by a first communication device and from a second communication device, a downlink (DL) OFDM data unit that includes a HT Control field of a MAC header. The HT Control field includes an indication of a number of OFDM symbols for a portion of the UL MU OFDM data unit. The method also includes generating, by the first communication device, the data portion of the UL OFDM data unit to have a length corresponding to the indicated number of OFDM symbols. The method further includes generating the UL OFDM data unit to include the data portion. The method includes transmitting, by the first communication device, the UL OFDM data unit to the second communication device.

In another embodiment, an apparatus for transmitting an UL OFDM data unit of an UL MU transmission includes a network interface device associated with a first communication device and having one or more integrated circuits ICs. The one or more ICs are configured to receive, from a second communication device, a DL OFDM data unit that includes a HT Control field of a MAC header. The HT Control field includes an indication of a number of OFDM symbols for a portion of the UL OFDM data unit. The one or more ICs are further configured to generate the data portion to have a length corresponding to the indicated number of OFDM symbols. The one or more ICs are configured to generate the UL OFDM data unit to include the data portion. The one or more ICs are further configured to transmit the UL OFDM data unit to the second communication device.

BRIEF DESCRIPTION OF THE DRAWINGS

FIG. 11A is a diagram of an example control subfield that includes UL MU response scheduling information, according to an embodiment.

FIG. 11B is a diagram of an example control subfield that includes UL MU response scheduling information, according to another embodiment.

FIG. 13A and FIG. 13B are diagrams of example control subfields that include UL MU response scheduling information for either an UL multi-user, multiple input multiple output (MU-MIMO) transmission or a non-MU-MIMO transmission.

DETAILED DESCRIPTION

In embodiments described below, a wireless network device such as a client station (STA) of a wireless local area network (WLAN) generates an uplink (UL) orthogonal frequency division multiplex (OFDM) data unit for transmission to an access point (AP). In general, the AP or other network device allocates or assigns radio resources of an OFDM communication channel to specific STAs or groups of STAs for data transfers using orthogonal frequency division multiple access (OFDMA). For example, the AP makes an allocation of one or more tones, tone blocks, or sub-channels of the OFDM communication channel to multiple STAs for an UL multi-user (MU) transmission. During a subsequent OFDMA data transfer, each of the STAs simultaneously transmits an OFDM data unit using its allocated sub-channels. In an embodiment, a client station provides an indication of availability of one or more sub-channels of the OFDM communication channel to the AP. The AP allocates sub-channels to the client stations based on the sub-channel availability, in an embodiment. The AP indicates a length for the OFDM data units of the UL MU transmission as a number of OFDM symbols, in an embodiment.

Figure 1:
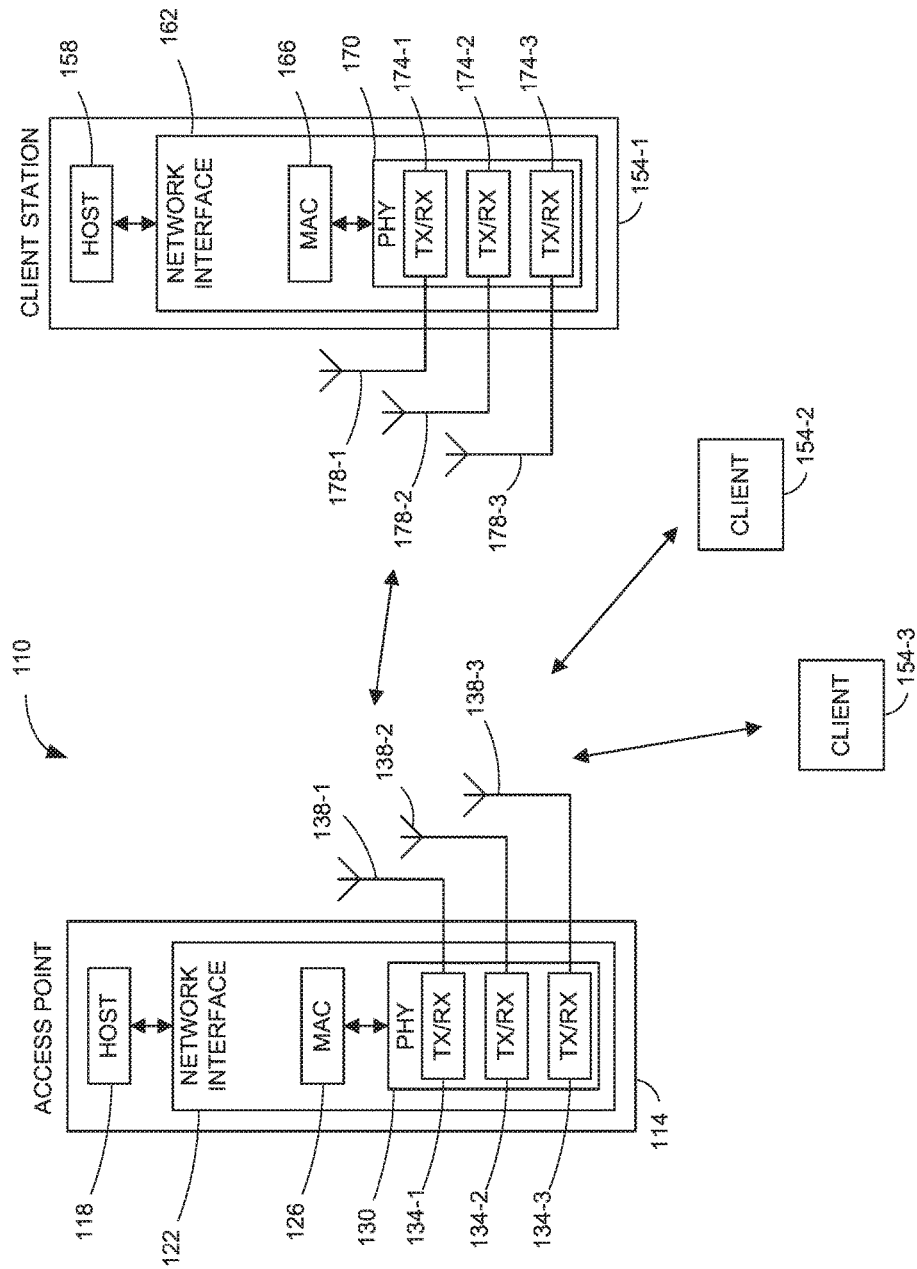
FIG. 1 is a block diagram of an example wireless local area network (WLAN), according to an embodiment.

FIG. 1 is a block diagram of an example WLAN 110, according to an embodiment. The WLAN 110 includes an access point (AP) 114 that comprises a host processor 118 coupled to a network interface device 122. The network interface device 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface device 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface device 122 may be implemented using a system on a chip (SoC), where the SoC includes at least a portion of the MAC processor 126 and at least a portion of the PHY processor 130.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface device 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface device 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface device 162 may be implemented using an SoC, where the SoC includes at least a portion of the MAC processor 166 and at least a portion of the PHY processor 170.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2A:
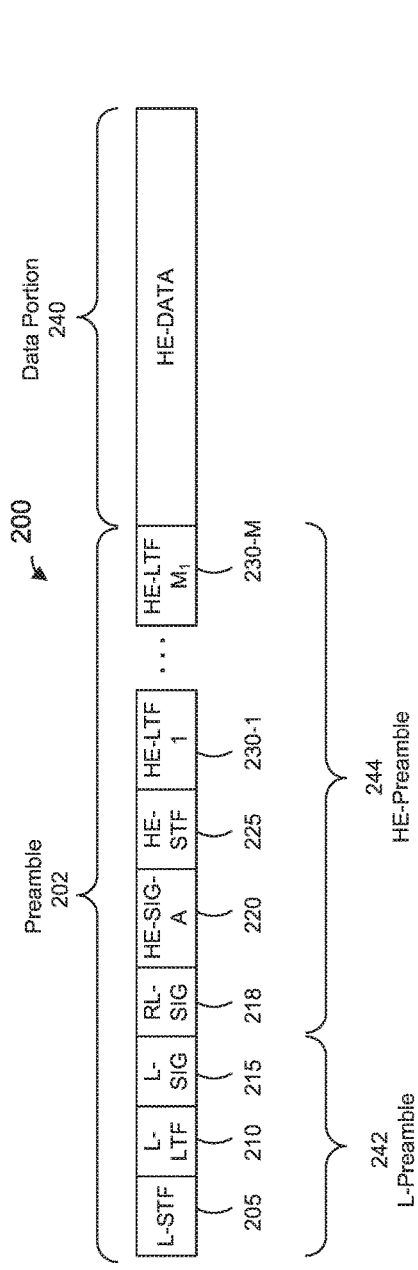
FIG. 2A is a block diagram of an example single-user physical layer (PHY) data unit, according to an embodiment.

FIG. 2A is a diagram of a single-user physical layer (PHY) data unit 200 that the network interface device 122 (FIG. 1) is configured to generate and transmit to one client station 154 (e.g., the client station 154-1), according to an embodiment. The network interface device 162 (FIG. 1) may also be configured to transmit data units the same as or similar to the data unit 200 to the AP 114. The data unit 200 may occupy a 20 MHz bandwidth or another suitable bandwidth. Data units similar to the data unit 200 occupy other suitable bandwidth such as 40 MHz, 80 MHz, 160 MHz, 320 MHz, 640 MHz, for example, or other suitable bandwidths, in other embodiments.

The data unit 200 includes a preamble 202 including a legacy short training field (L-STF) 205, a legacy long training field (L-LTF) 210, a legacy signal field (L-SIG) 215, a repeated L-SIG field (RL-SIG) 218, a high efficiency (HE) signal field (HE-SIG-A) 220, an HE short training field (HE-STF) 225, and M HE long training fields (HE-LTFs) 230, where M is a suitable positive integer. In an embodiment, M generally corresponds to (e.g., is greater than or equal to) a number of spatial streams via which the data unit 200 will be transmitted. A legacy preamble portion 242 of the preamble 202 includes the L-STF 205, L-LTF 210 and L-SIG 215. An HE preamble portion 244 of the preamble 202 includes the RL-SIG 218, the HE-SIG-A 220, the HE-STF 225 and the M HE-LTFs 230. The data unit 200 also includes a data portion 240. In some scenarios, the data unit 200 may omit the data portion 240, for example, for a Quality of Service (QoS) null data frame.

In some embodiments, the preamble 202 omits one or more of the fields 205-230. In some embodiments, the preamble 202 includes additional fields not illustrated in FIG. 2A.

Each of the L-STF 205, the L-LTF 210, the L-SIG 215, the RL-SIG 218, the HE-SIG-A 220, the HE-SIG-B 222, the HE-STF 225, and the M HE-LTFs 230 comprises one or more OFDM symbols. As merely an illustrative example, the HE-SIG-A 220 comprises two OFDM symbols. As additional illustrative examples, the data portion 240 comprises zero, one, or more OFDM symbols.

In the illustration of FIG. 2A, the data unit 200 includes one of each of the L-STF 205, the L-LTF 210, the L-SIG 215, the RL-SIG 218 and the HE-SIG-A 220. In some embodiments in which a data unit similar to the data unit 200 occupies a cumulative bandwidth other than 20 MHz, each of the L-STF 205, the L-LTF 210, the L-SIG 215, the RL-SIG 218, and the HE-SIG-A 220 is repeated over a corresponding number of 20 MHz sub-bands of the whole bandwidth of the data unit, in an embodiment. For example, in an embodiment in which the data unit occupies an 80 MHz bandwidth, the data unit 200 includes four of each of the L-STF 205, the L-LTF 210, the L-SIG 215, the RL-SIG 218, and the HE-SIG-A 220.

In an embodiment, the HE-SIG-A 220 generally carries information about the format of the data unit 200, such as information needed to properly decode at least a portion of the data unit 200, in an embodiment. In some embodiments, HE-SIG-A 220 additionally includes information for receivers that are not intended receivers of the data unit 200, such as information needed for medium protection, spatial reuse, etc.

Figure 2B:
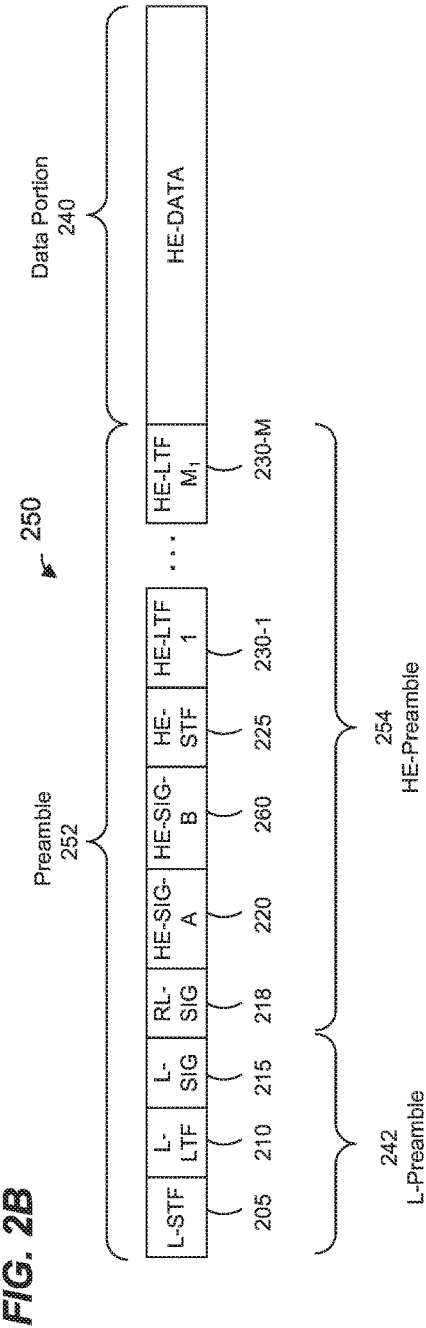
FIG. 2B is a block diagram of an example multi-user PHY data unit, according to an embodiment.

FIG. 2B is a diagram of a multi-user PHY data unit 250 that the network interface device 122 (FIG. 1) is configured to transmit to multiple client stations 154, according to an embodiment. The network interface device 162 (FIG. 1) may also be configured to generate and transmit data units the same as or similar to the data unit 250. The data unit 250 may occupy a 20 MHz bandwidth or another suitable bandwidth. Data units similar to the data unit 250 occupy other suitable bandwidth such as 40 MHz, 80 MHz, 160 MHz, 320 MHz, 640 MHz, for example, or other suitable bandwidths, in other embodiments.

In an embodiment, the data unit 250 is a downlink (DL) orthogonal frequency division multiple access (OFDMA) data unit in which independent data streams are transmitted to multiple client stations 154 using respective sets of OFDM tones and, in some cases respective spatial streams, allocated to the client stations 154. For example, in an embodiment, available OFDM tones (e.g., OFDM tones that are not used as DC tone and/or guard tones) are segmented into multiple resource units (RUs), and each of the multiple RUs is allocated to transmissions to one or more client stations 154. The data unit 250 is similar to the data unit 200 of FIG. 2A, and like-numbered elements are not described again in detail for purposes of brevity.

The data unit 250 includes a preamble 252 similar to the preamble 202 (FIG. 2A). The preamble 252 includes an HE portion 254 similar to the HE portion 244 (FIG. 2A). The HE portion 254 includes an HE signal field (HE-SIG-B) 260.

In an embodiment in which a data unit similar to the data unit 250 occupies a cumulative bandwidth other than 20 MHz, the HE-SIG-B 260 is repeated over a corresponding number of 20 MHz sub-bands of the whole bandwidth of the data unit. In another embodiment in which a data unit similar to the data unit 250 occupies a cumulative bandwidth other than 20 MHz, the HE-SIG-B 260 includes different channel-specific portions corresponding to different 20 MHz subbands of the whole bandwidth of the data unit, and the different channel specific portions are transmitted in parallel in the corresponding 20 MHz sub-bands of the whole bandwidth of the data unit 250.

The HE-SIG-A 220 and the HE-SIG-B 260 generally carry information about the format of the data unit 250, such as information needed to properly decode at least a portion of the data unit 250, in an embodiment. The HE-SIG-A 220 carries information commonly needed by multiple intended receivers of the data unit 250. On the other hand, the HE-SIG-B 260 carries user-specific information individually needed by each intended receiver of the data unit 250. In an embodiment, HE-SIG-A 220 includes information needed to properly decode HE-SIG-B 260, and HE-SIG-B 260 includes information needed to properly decode data streams in the data portion 240 of the data unit 250.

Figure 3:
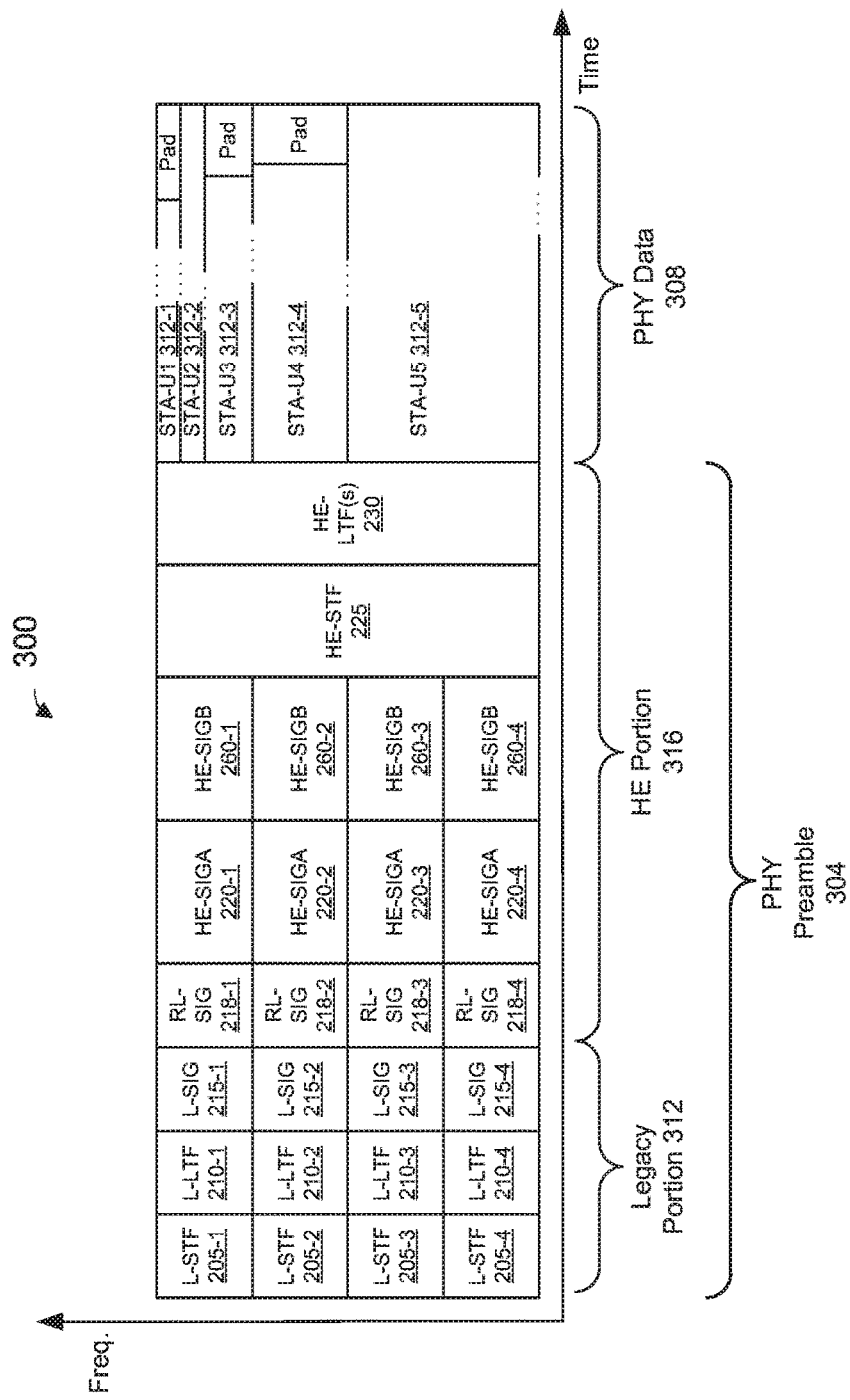
FIG. 3 is a block diagram of another example multi-user PHY data unit, according to an embodiment.

FIG. 3 is a diagram of a multi-user PHY data unit 300 that the network interface device 122 (FIG. 1) is configured to transmit to multiple client stations 154, according to an embodiment. The network interface device 162 (FIG. 1) may also be configured to generate and transmit data units the same as or similar to the data unit 250. The data unit 300 occupies an 80 MHz bandwidth (e.g., an 80 MHz composite communication channel). Data units similar to the data unit 300 occupy other suitable bandwidth such as 40 MHz, 120 MHz, 160 MHz, 320 MHz, 640 MHz, etc., for example, or other suitable bandwidths, in other embodiments.

In an embodiment, the data unit 300 is a downlink (DL) OFDMA data unit in which independent data streams are transmitted to multiple client stations 154 using respective sets of OFDM tones and, in some cases respective spatial streams, allocated to the client stations 154.

The data unit 300 includes a PHY preamble 304 and a PHY data portion 308. The PHY preamble 304 includes a legacy portion 312 and an HE portion 316.

The legacy portion 312 includes L-STFs 205, L-LTFs 210, and L-SIGs 215. In an embodiment, each L-STF 205, L-LTF 210, and L-SIG 215 spans an individual component channel (e.g., a subchannel of an OFDM communication channel) of a composite communication channel (e.g., the entire OFDM communication channel) and is duplicated in other individual component channels. For example, in an embodiment, each L-STF 205, L-LTF 210, and L-SIG 215 spans an individual 20 MHz component channel and is duplicated in other individual 20 MHz component channels.

The HE portion 216 includes RL-SIGs 218, HE-SIGAs 220, HE-SIGBs 260, HE-STF 225, one or more HE-LTF(s) 230. In an embodiment, each HE-SIG-A 220 spans an individual component channel and is duplicated in other individual component channels. For example, in an embodiment, each HE-SIGA 220 spans an individual 20 MHz component channel and is duplicated in other individual 20 MHz component channels. In other embodiments, respective HE-SIGAs 220 in respective individual channels are not duplicates but rather may include different information.

In an embodiment, respective HE-SIGBs 260 span respective individual component channels similar to the HE-SIGAs 220. In some embodiments, at least one of the HE-SIGBs 260 includes different information than another HE-SIGB 260.

Each of the HE-STF 225 and the HE-LTF(s) 230 span the composite communication channel, in an embodiment.

In some embodiments, the preamble 304 omits one or more fields illustrated in FIG. 3 (e.g., HE-SIGBs 260). In some embodiments, the preamble 304 includes additional fields not illustrated in FIG. 3.

Figure 4:
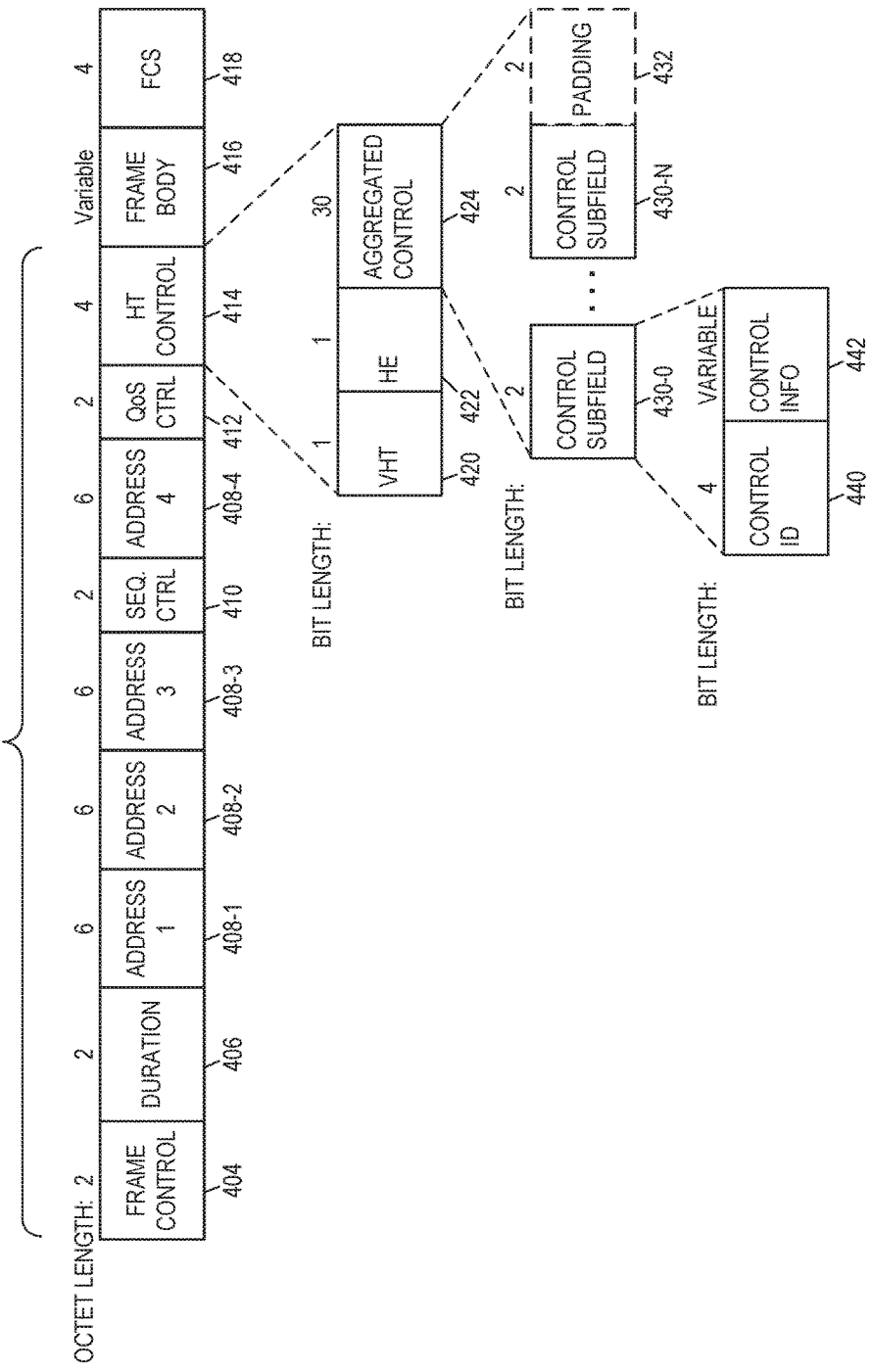
FIG. 4 is a diagram of a medium access control (MAC) protocol data unit (MPDU), according to an embodiment.

FIG. 4 is a diagram of an MPDU 400, according to an embodiment. The MPDU 400 includes a MAC header 402, a frame body 416, and a frame check sequence field 418. In various embodiments, at least a portion of the MPDU 400 generally conforms to the IEEE Standard for Information Technology, Part 11: Wireless LAN Medium Access Control (MAC) and Physical Layer (PHY) Specifications, Amendment 4, Enhancements for Very High Throughput for Operation in Bands below 6 GHz, 2013 ("the IEEE 802.11ac-2013 standard"), the disclosure of which is incorporated herein by reference in its entirety. The number above each field in FIG. 4 indicates the number of octets ("Octet Length") or bits ("Bit Length") occupied by the corresponding field. Accordingly, the MAC header 402 includes a frame control field 404 (2 octets), a duration/ID field 406 (2 octets), a first address (A1) field 408-1 (6 octets), a second address (A2) field 408-2 (6 octets), a third address (A3) field (6 octets) 408-3, a sequence control field 410 (2 octets), a fourth address (A4) field 408-4 (6 octets), a QoS control field 412 (2 octets), and an HT control field 414 (4 octets). The MPDU 400 also includes the frame body 416 and the four-octet frame check sequence (FCS) field 418. In some embodiments, the frame body 416 is omitted (e.g., a null data frame). Each of the address fields 408 is a 48 bit (6 octet) field that includes a globally unique MAC address of a device associated with the MPDU 400, such as a transmitting device of the MPDU 400, a receiving device of the MPDU 400, etc. In some embodiments, the MAC header 402 omits one or more fields illustrated in FIG. 4 (e.g., address field A4 408-4, QoS Control field 412). In some embodiments, the MAC header 402 includes additional fields not illustrated in FIG. 4.

In various embodiments, the MPDU 400 is a data frame, control frame, management frame, or other suitable frame that repurposes the HT control field 414 to include suitable control information, as described below. In an embodiment, the HT Control field 414 is a high efficiency (HE) variant HT Control field and thus differs from the HT Control field described in the IEEE 802.11ac-2013 standard. In the embodiment shown in FIG. 4, the HE variant HT control field 414 includes a very high throughput (VHT) indicator subfield 420 (1 bit), an HE indicator subfield 422, and an aggregated control subfield 424 (30 bits).

The VHT indicator subfield 420 indicates whether the format of the HT control field 414 is based on an HT format or on an VHT format, as described in IEEE 802.11ac, Section 8.2.4.6 HT Control field. Additionally, the HE indicator subfield 422 indicates whether the format of the HT Control field 414 is based on the VHT format or the HE format. In an embodiment, the VHT indicator subfield 420 and the HE indicator subfield 422, are set to a value of 1 (or other suitable value) to indicate that the HT Control field 414 is an HE variant HT Control field. In this embodiment, the HE variant HT Control field 414 includes the aggregated control field 424, for example, instead of other fields associated with the HT or VHT variants of the HT control field.

In various embodiments, the aggregated control subfield 424 includes one or more control subfields 430 (430-0, 430-1, . . . 430-N) and optionally, one or more padding bits 432 (e.g., to reach a total length of 30 bits for the aggregated control subfield 424). In an embodiment, each control subfield 430 includes a control ID subfield 440 (4 bits) and a control information subfield 442 (variable bit length), where the control ID subfield 440 indicates a fixed length and format of the corresponding control information subfield 442.

In some scenarios, a plurality of MPDUs 400 are included in an aggregate MPDU (A-MPDU, not shown), and thus the A-MPDU includes a plurality of HT Control fields 414. In an embodiment, each MPDU within the A-MPDU includes HT Control fields 414 that have a same value, and thus a device that receives the A-MPDU can skip decoding of subsequent HT Control fields 414 in the A-MPDU. In other embodiments, different MPDUs within the A-MPDU carry different instances of the HE variant HT Control field, and thus more than 30 bits of control subfields 430 are available. In an embodiment where multiple MPDUs of the A-MPDU have control subfields 430 with a same control ID subfield 440, the corresponding control information (442) is the same.

Figure 5:
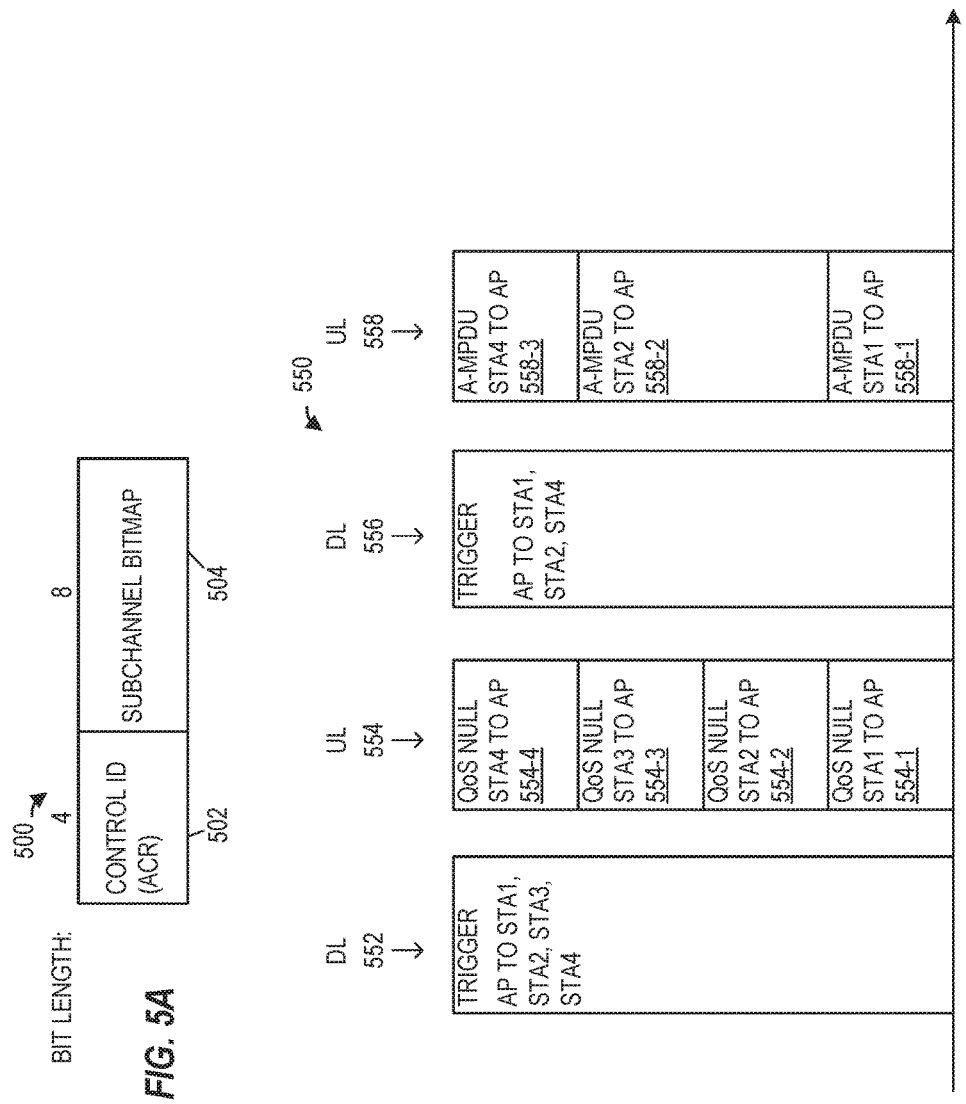
FIG. 5A is a diagram of an example control subfield that includes an available channel report, according to an embodiment.
FIG. 5B is an example sequence of orthogonal frequency division multiplex (OFDM) data units for providing an available channel report to an access point, according to an embodiment.

FIG. 5A is a diagram of an example control subfield 500 that includes an available channel report, according to an embodiment. In some scenarios, a subchannel at a client station 154 is busy, while the subchannel appears available at the AP 114. The client station 154 provides the available channel report to the AP 114 to reduce the likelihood of a "wasted" subchannel in a subsequent UL MU transmission, for example, where the AP 114 allocates a subchannel to a first client station that cannot utilize the subchannel, while a second client station could have utilized the subchannel during the UL MU transmission.

The control subfield 500 generally corresponds to the control subfield 430 and includes a control ID subfield 502 (4 bits) and a subchannel bitmap 504 (8 bits), in an embodiment. The control ID subfield 502 has a value indicating that the control subfield 500 includes the available channel report as the subchannel bitmap 504. In an embodiment, the subchannel bitmap 504 includes one bit per subchannel of a composite OFDM communication channel. In the embodiment shown in FIG. 5A, the subchannel bitmap 504 includes 8 bits with each bit corresponding to a 20 MHz subchannel of a 160 MHz composite OFDM communication channel. In other embodiments, the subchannel bitmap 504 has 4 bits, 5 bits, or another suitable length. In other embodiments, each bit corresponds to a 10 MHz subchannel, a 40 MHz subchannel, or other suitable subchannel bandwidth.

In an embodiment, the client station 154 determines an availability of the subchannels of the composite OFDM communication channel (e.g., via a carrier sense mechanism) and generates values for the bits of the subchannel bitmap 504 to indicate whether the corresponding subchannel is available for transmission and/or reception of an OFDM data unit by the client station 154. As an example, a value of "1" indicates that the subchannel is busy/unavailable and a value of "0" indicates that the subchannel is available.

FIG. 5B is an example sequence 550 of OFDM data units for providing an available channel report to an AP, according to an embodiment. The sequence 550 includes downlink non-HT (duplicate) PPDU with broadcast frames or downlink OFDMA data units 552 and 556, which are transmitted by the AP 114 to multiple client stations 154 (e.g., client stations STA1, STA2, STA3, and STA4), and also includes uplink OFDMA data units 554 and 558, which are transmitted by at least some of the multiple client stations to the AP 114 in response to the downlink OFDMA data units 552 and 556, in an embodiment.

In an embodiment, the data unit 552 corresponds to a trigger frame or multiple trigger frames for the multiple client stations STA1, STA2, STA3, and STA4. In response to the trigger frame, each of the multiple client stations STA0, STA1, STA2, and STA3 determines an availability of one or more subchannels, generates a respective MPDU 400 with the control subfield 500, and transmits an OFDM data unit 554-1, 554-2, 554-3, and 554-4, respectively, to the AP 114 via sub-channels indicated in the trigger frame. For example, the OFDMA data unit 554 includes respective MPDUs 400 that provide available channel reports from the multiple client stations 154 to the access point 114. In an embodiment, the MPDU 400 is a QoS null frame that omits the frame body 416.

In an embodiment, the AP 114 allocates sub-channels to the client stations based on the available channel reports from the multiple client stations. In the embodiment shown in FIG. 5B, the AP 114 allocates sub-channels to the client stations STA1, STA2, and STA4 and indicates the allocation in a trigger frame 556. In response to the trigger frame 556, the client stations STA1, STA2, and STA4 transmit A-MPDUs within OFDM data units 558-1, 558-2, and 558-3, respectively, via sub-channels indicated in the trigger frame 556.

In some embodiments, the client station 154 generates the QoS Control field 412 of the MPDU 400 in the OFDM data unit 554 to include buffer information corresponding to MPDUs that are queued for transmission by the client station 154. In other embodiments, the client station 154 generates a control subfield 430 of the MPDU 400 that includes buffer information. In an embodiment, the AP 114 allocates the sub-channels based on the available channel report and the buffer information.

Figure 6:
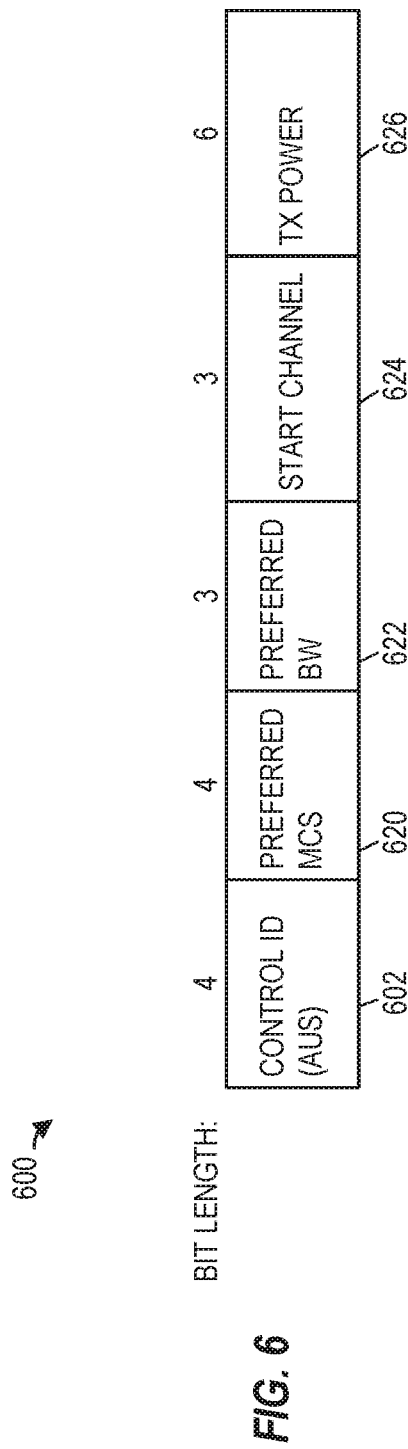
FIG. 6 is a diagram of an example control subfield that includes advised uplink schedule information, according to an embodiment.

FIG. 6 is a diagram of an example control subfield 600 that includes advised uplink schedule (AUS) information, according to an embodiment. In some scenarios, a client station 154 provides an indication of requested parameters for a subsequent UL MU transmission. The control subfield 600 generally corresponds to the control subfield 430 and includes a control ID subfield 602 (4 bits), a preferred MCS subfield 620 (4 bits), a preferred bandwidth subfield 622 (3 bits), a start channel subfield 624 (3 bits), and a transmission power subfield 626 (6 bits), in an embodiment. The control ID subfield 602 has a value indicating that the control subfield 600 includes the remaining fields 620, 622, 624, and 626. Although the remaining fields 620, 622, 624, and 626 have bit lengths of 4 bits, 3 bits, 3 bits, and 6 bits in the illustrated embodiment, one or more of the remaining fields have different bit lengths (i.e., more bits or fewer bits) in other embodiments.

The preferred MCS subfield 620 indicates a preferred MCS that the client station 154 would prefer to use for the subsequent UL MU transmission. The preferred bandwidth subfield 622 indicates a bandwidth that the client station 154 would prefer to use for the subsequent UL MU transmission. For example, the preferred bandwidth subfield 622 has a value corresponding to 26 tones, 2×26 tones, 4×26 tones, 20 MHz, 40 MHz, 80 MHz, or other suitable radio resource allocation. The start channel subfield 624 indicates a sub-channel that the client station 154 would prefer to use for the subsequent UL MU transmission. For example, for a 160 MHz composite OFDM channel, a value of 0 corresponds to a primary 20 MHz sub-channel, a value of 1 corresponds to a second 20 MHz sub-channel, etc. The transmission power subfield 626 indicates a desired transmission power that the client station 154 would prefer to use for the subsequent UL MU transmission.

Figure 7:
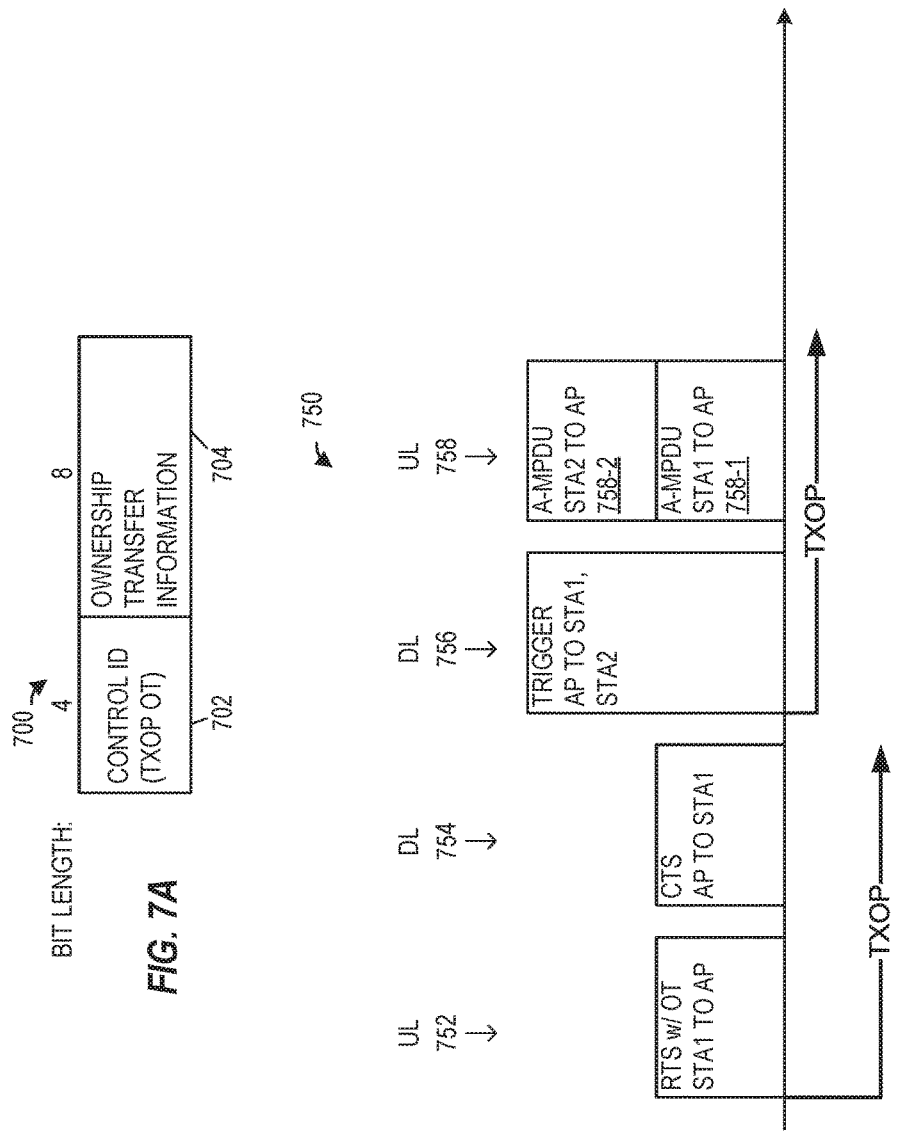
FIG. 7A is a diagram of an example control subfield that includes ownership transfer information for a transmission opportunity (TXOP), according to an embodiment.
FIG. 7B is an example sequence of OFDM data units for providing ownership transfer information for a TXOP, according to an embodiment.

FIG. 7A is a diagram of an example control subfield 700 that includes ownership transfer information for a transmission opportunity (TXOP), according to an embodiment. In some scenarios, a client station 154 that "owns" or has been assigned a first TXOP releases and transfers the first TXOP to the AP 114 associated with the client station 154. The transfer of the first TXOP allows the AP 114 to schedule an UL MU transmission that more efficiently utilizes the composite OFDM channel as compared to an UL single user transmission. For example, the client station 154 includes an MPDU with the control subfield 700 in an UL OFDM data unit to the AP 114. In some embodiments, the MPDU includes the control subfield 700 and optionally, buffer information corresponding to data MPDUs that are queued for transmission by the client station 154.

The control subfield 700 generally corresponds to the control subfield 430 and includes a control ID subfield 702 (4 bits) and an ownership transfer information subfield 704 (8 bits), in an embodiment. The control ID subfield 702 has a value indicating that the control subfield 700 includes the ownership transfer information subfield 704. In an embodiment, the ownership transfer information subfield 704 indicates a duration of the TXOP. In other embodiments, the ownership transfer information subfield 704 has a bit length less than or more than 8 bits. In an embodiment, the client station 154 indicates whether it requests an allocation in the remainder of the TXOP after transfer to the AP 114, for example, by providing an indication in the ownership transfer information subfield 704. In another embodiment, the indication is provided by the buffer information included in the MPDU (i.e., a non-zero buffer value).

FIG. 7B is an example sequence 750 of OFDM data units for providing ownership transfer information for a TXOP, according to an embodiment. The sequence 700 includes DL OFDM data unit 754 and DL OFDM data unit 756, which are transmitted by the AP 114 to one or more client stations 154 (e.g., client stations STA1, STA2), and also includes UL OFDM data units 752 and UL OFDMA data units 758, which are transmitted by at least some of the client stations to the AP 114 in response to the DL data unit, in an embodiment.

In various embodiments, the client station 154 (STA1) generates the UL OFDM data unit 752 to include the MPDU 400 with the control subfield 700. In the embodiment shown in FIG. 7B, the MPDU 400 is a control frame, for example, a request to send (RTS) frame. In some embodiments, the MPDU 400 in data unit 752 is a data frame or management frame with the control subfield 700. In response to the UL OFDM data unit 752, the AP 114 transmits a clear to send (CTS) frame to the client station 114 (STA1) to acknowledge the transfer of the TXOP. The AP 114 generates the OFDM data unit 756 to include a trigger frame that indicates an allocation of subchannels for the client stations (e.g., a subsequent UL MU transmission) during a second TXOP. In the embodiment shown in FIG. 7B, the trigger frame indicates an allocation of subchannels to client stations STA1 and STA2. In response to the trigger frame 756, the client stations STA1 and STA2 transmit A-MPDUs within OFDM data units 758-1 and 758-2, respectively, via sub-channels indicated in the trigger frame 756.

In the embodiment shown in FIG. 7B, the first TXOP and the second TXOP are two separate TXOPs. In some scenarios, the first TXOP and the second TXOP have different bandwidths. If the bandwidth of the second TXOP is wider than the bandwidth of the first TXOP, then the time between the end of the first TXOP and the beginning of the second TXOP is a priority interframe space (PIFS). If the bandwidth is the same or narrower, then the time between the end of the first TXOP and the beginning of the second TXOP is a short interframe space (SIFS).

Figure 8:
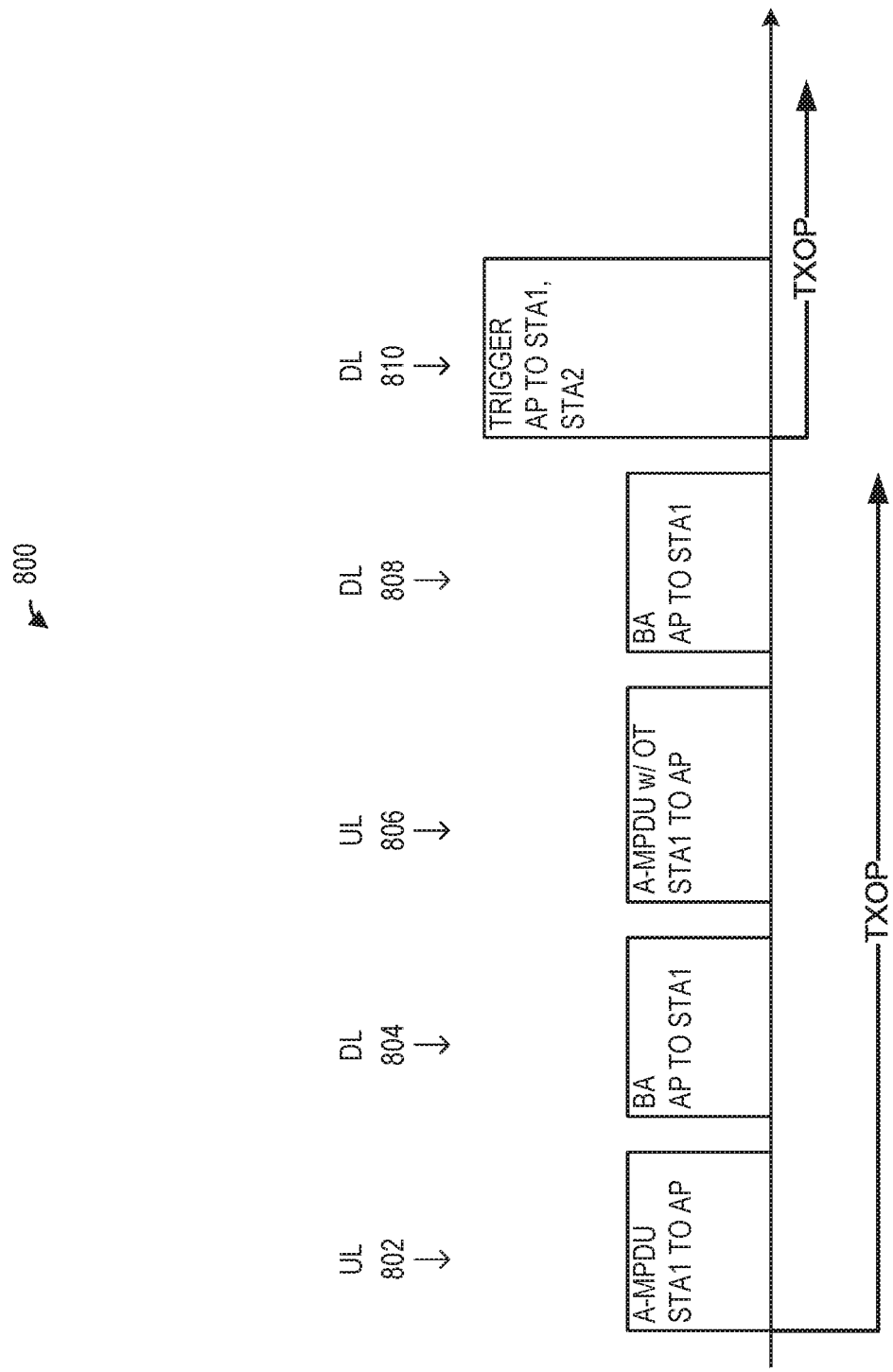
FIG. 8 is an example sequence of OFDM data units for providing ownership transfer information for a TXOP, according to an embodiment.

FIG. 8 is an example sequence 800 of OFDM data units for providing ownership transfer information for a TXOP, according to an embodiment. The sequence 800 includes DL OFDM data units 804 and 808 and DL OFDM data unit 810, which are transmitted by the AP 114 to one or more client stations 154 (e.g., client stations STA1, STA2), and also includes UL OFDM data units 802 and 806, which are transmitted by at least some of the client stations to the AP 114, in an embodiment.

In the sequence 800, the client station STA1 transmits one or more UL OFDM data units 802 and 806 with A-MPDUs during the first TXOP. In the A-MPDU of the UL OFDM data unit 806, the client station STA1 includes the MPDU 400 with the control subfield 700 to transfer the TXOP to the AP 114. The AP 114 acknowledges the UL OFDM data units 802 and 806 with block acknowledgments (BA) in the DL OFDM data units 804 and 808. In an embodiment, the AP 114 includes an acknowledgment of the transfer of the TXOP in the BA of the DL OFDM data unit 808. The DL OFDM data unit 810 generally corresponds to the DL OFDM data unit 756 and includes a trigger frame that indicates an allocation of subchannels for the client stations.

In the embodiments shown in FIG. 7B and FIG. 8, the first TXOP and a second TXOP that includes the UL MU transmission are two separate TXOPs. In other embodiments, the first TXOP and the second TXOP are the same TXOP (e.g., the second TXOP has a duration corresponding to a remaining duration of the first TXOP). In one scenario, the UL OFDM data units and the DL OFDM data units have a same bandwidth, for example, according to the bandwidth rules of the TXOP. In another scenario, the UL OFDM data units and the DL OFDM data units have different bandwidths, where a wider bandwidth corresponds to a PIFS between the trigger frame and preceding frame (e.g., CTS or BA).

Figure 9:
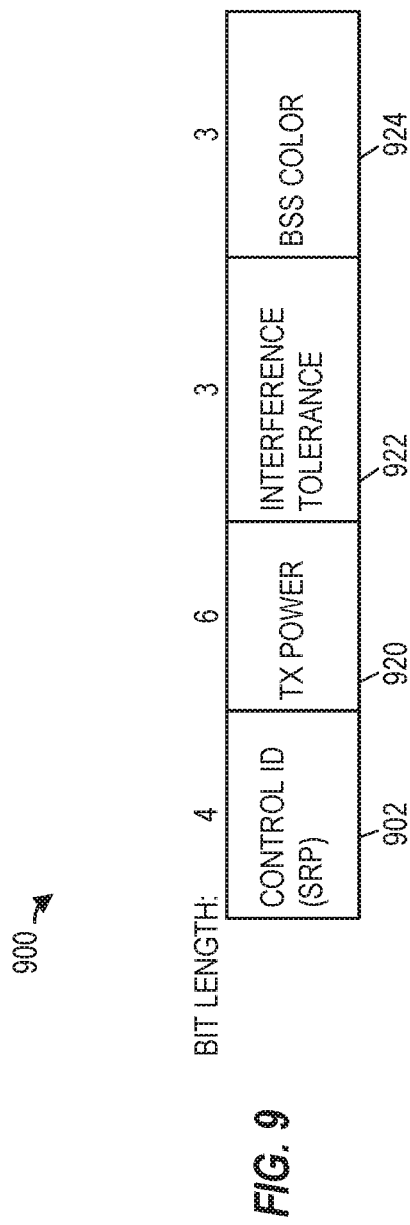
FIG. 9 is a diagram of an example control subfield that includes spatial reuse parameters, according to an embodiment.

FIG. 9 is a diagram of an example control subfield 900 that includes spatial reuse parameters, according to an embodiment. In some scenarios, a client station 154 provides spatial reuse parameters to the AP 114 in the control subfield 900 in a data frame, management frame, or control frame, and thus spatial reuse is supported without new frame definitions specific to spatial reuse. The AP 114 utilizes the spatial reuse parameters for simultaneous PPDU transmissions from neighbor BSSs during a TXOP. In other scenarios, the AP 114 provides spatial reuse parameters to client stations 154 and APs in neighbor BSSs in the control subfield 900.

The control subfield 900 generally corresponds to the control subfield 430 and includes a control ID subfield 902 (4 bits), a transmission power subfield 920 (6 bits), an interference tolerance subfield 922 (3 bits), and a basic service set (BSS) color subfield 924 (3 bits), in an embodiment. The control ID subfield 902 has a value indicating that the control subfield 900 includes the remaining subfields 920, 922, and 924. Although the remaining fields 920, 922, and 924 have bit lengths of 6 bits, 3 bits, and 3 bits in the illustrated embodiment, one or more of the remaining fields have different bit lengths (i.e., more bits or fewer bits) in other embodiments.

The transmission power subfield 920 indicates a transmission power of the PPDU that carries the control subfield 900. The interference tolerance subfield 922 indicates a tolerance to interference during reception of PPDUs at the client station 154 that transmits the control subfield 900. The BSS color subfield 924 identifies the AP 114 with which the client station 154 is associated. The spatial reuse parameters provided by subfields 920, 922, and 924 allow for improved utilization of OFDM channels and power saving by early identification of signals from overlapping BSSs and interference management. For example, the AP 114 receives the control subfield 900 from a client station STA2 that is not associated with the AP 114 (i.e., STA2 is associated with a different BSS, as indicated by the BSS color subfield 924). The AP 114 estimates a path loss between the AP 114 and the client station STA2. Based on the path loss, the AP 114 utilizes a transmission power for PPDUs to a client station STA1 so that the transmission power, minus the path loss, is less than the tolerance to interference during reception of the client station STA2. By adjusting the transmission power, the AP 114 can transmit PPDUs to the client station STA1 simultaneously with reception of other PPDUs (e.g., from a different AP) by the client station STA2.

Figure 10:
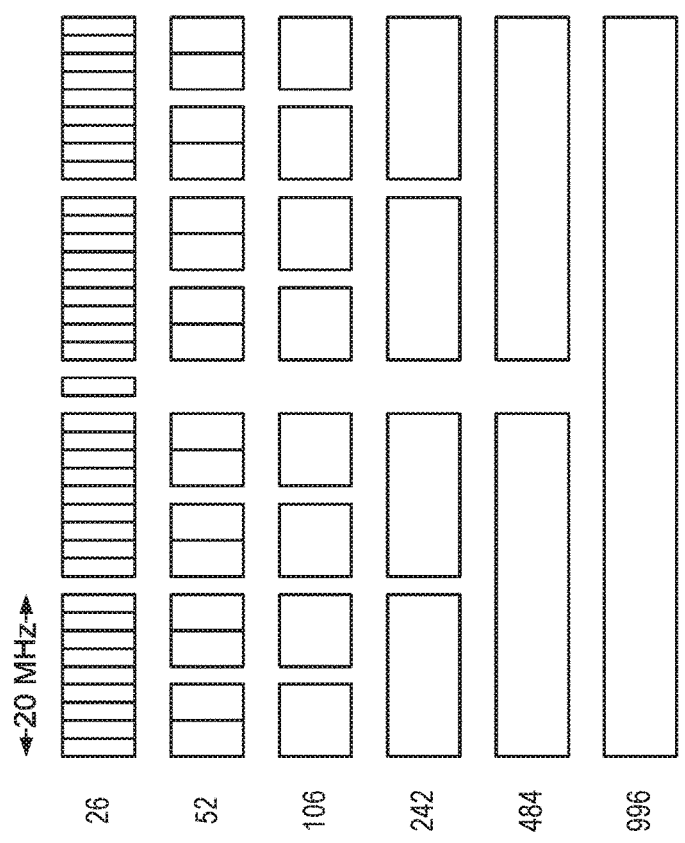
FIG. 10 is a diagram of an example allocation table of indices for indicating a resource unit allocation to a client station for a subsequent uplink (UL) multi-user (MU) transmission, in an embodiment.

FIG. 10 is a diagram of an example allocation table 1000 of indices for indicating an RU allocation to a client station for a subsequent UL MU acknowledgement transmission, in an embodiment. An index from the allocation table 1000 can be provided as UL MU response scheduling information, as described below. In an embodiment, if the DL MU transmission bandwidth is 160 MHz or 80+80 MHz, the DL MU transmission in one 80 MHz channel is acknowledged by an acknowledgment frame, block acknowledgment frame, or multi-station block acknowledgment frame in the same 80 MHz channel. In some embodiment, if the DL MU transmission bandwidth is 160 MHz or 80+80 MHz, the DL MU transmission in one 80 MHz channel is acknowledged by an acknowledgment frame, block acknowledgment frame, or multi-station block acknowledgment frame in any 80 MHz channel. With this embodiment, an additional bit in the allocation table 1000, e.g., utilizing an 8 bit index, indicates whether the allocated RU is in the primary 80 MHz channel or secondary 80 MHz channel.

FIG. 11A is a diagram of an example control subfield 1100 that includes UL MU response scheduling information, according to an embodiment. The UL MU response scheduling information is provided to multiple client stations for an HE trigger-based PPDU that carries an immediate acknowledgment and follows the DL MU PPDU that contains the control subfield 1100. The control subfield 1100 generally corresponds to the control subfield 430 and includes a control ID subfield 1102 (4 bits), an UL PPDU length subfield 1104 (5 bits), a DL transmission power subfield 1106 (5 bits), a target UL reception power subfield 1108 (5 bits), a resource unit (RU) allocation subfield 1110 (8 bits), and a start spatial stream subfield 1112 (3 bits), in an embodiment. Other parameters for the UL MU transmission can be included in the control subfield 1100, or can be the same as the DL MU transmission that solicits the UL MU transmission. If those parameters of UL MU transmission are different from the DL soliciting MU PPDU, a trigger frame is used to provide the parameters instead of the control subfield 1100.

The control ID subfield 1102 has a value indicating that the control subfield 1100 includes the remaining subfields 1104, 1106, 1108, 1110, and 1112. Although the remaining fields have bit lengths of 5 bits, 5 bits, 5 bits, 8 bits, and 3 bits, in the illustrated embodiment, one or more of the remaining fields have different bit lengths (i.e., more bits or fewer bits) in other embodiments.

The UL PPDU length subfield 1104 provides an indication of the number of OFDM symbols for a portion of the UL MU responding PPDU 200 that contains the acknowledgement, for example, the portion of the PHY data unit 200 after the HE preamble 244 (e.g., the PHY data portion 308). The UL PPDU length subfield 1104 corresponds to the number of OFDM symbols instead of a time interval (e.g., microseconds) to reduce the length of the subfield 1104. For example, a 9-bit length indicator for microseconds (µs) can indicate up to 512 µs with 1 µs granularity and 1024 µs with 2 µs granularity. However, by using a number of OFDM symbols, a 6-bit length indicator can indicate as long as $(2^6)*(12.8$ µs symbol length+0.8 µs guard interval)+legacy preamble portion 242 length+HE preamble portion 244 length, which is greater than 870 µs, and a 5-bit length indicator can indicate as long as $(2^5)*(12.8$ µs+0.8 µs)+legacy preamble portion 242 length+HE preamble portion 244 length, which is greater than 435.2 µs.

The DL transmission power subfield 1106 indicates a transmission power with which the DL MU PPDU 200 that contains the control subfield 1100 was transmitted by the AP 114. The target UL reception power subfield 1108 corresponds to a desired reception power of the UL MU acknowledgement transmission to be received by the AP 114. In an embodiment, the client station 154 estimates the path loss between the AP 114 and itself based on the DL transmission power subfield 1106 and a receive power of the PPDU 200 from the AP 114. The client station 154 determines a transmission power for an UL transmission to the PPDU 200 based on the target UL reception power subfield 1108 and the path loss.

In various embodiments, the target UL reception power subfield 1108 indicates a reception power between −90+x dBm to −59+x dBm in 5 bits with 1 dB increments where x is a first preconfigured constant, −90+x dBm to −43.5+x dBm in 5 bits with 3/2 dB increments where x is a second preconfigured constant, or −90+x dBm to −27+x dBm in 6 bits with 1 dB increments where x is a third preconfigured constant. In an embodiment, a most recent path loss from the AP 114 calculated based on a received trigger frame or beacon frame is used by the client station 154 to calculate the transmission power for the UL transmission by the client station 154. In other embodiments, the DL transmission power subfield 1106 indicates the transmission power. In various embodiments, the DL transmission power subfield 1106 indicates a reception power between 23-x dBm to −8-x dBm in 5 bits with 1 dB increments, where x is a first preconfigured value, 23-x dBm to −23.5-x dBm in 5 bits with 3/2 dB increments where x is a second preconfigured value, or 23-x dBm to −40+x dBm in 6 bits with 1 dB increments where x is a third preconfigured value.

The RU allocation subfield 1110 indicates an allocation of radio resources for the UL MU transmission. In an embodiment, the RU allocation subfield 1110 includes a first bit that indicates whether the allocated RU is located in the primary or non-primary 80 MHz sub-channel (i.e., 0 for primary, 1 for non-primary) and seven additional bits that correspond to an index of the allocation table 1000.

The start spatial stream subfield 1112 indicates a spatial stream in which the UL transmission should be transmitted when the UL transmission is part of a multi-user, multiple input multiple output (MU-MIMO) transmission. In some embodiments, more than one spatial stream is available for a single client station and the control subfield 1100 includes an additional subfield (not shown) to indicate a number of spatial streams to be used for the UL acknowledgment.

FIG. 11B is a diagram of an example control subfield 1150 that includes UL MU response scheduling information, according to another embodiment. The control subfield 1150 is generally similar to the control subfield 1100, but omits the DL transmission power subfield 1106 and further includes an optional MCS subfield 1152 (3 bits). The MCS subfield 1152 indicates which MCS should be used for the UL acknowledgment, with values corresponding to MCS0 to MCS7, in an embodiment. In other embodiments, the MCS subfield 1152 is omitted and each client station determines the MCS based on MCS selection rules (e.g., the maximal mandatory MCS which is less than the DL MU MCS) or selects the most robust MCS that can fit in UL RU bandwidth and PPDU length.

Figure 12:
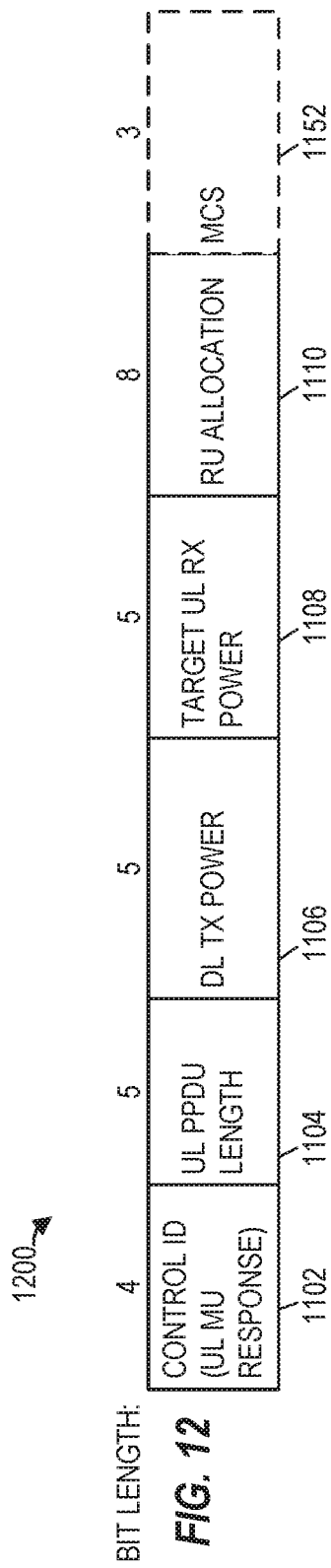
FIG. 12 is a diagram of an example control subfield that includes UL MU response scheduling information, according to yet another embodiment.

FIG. 12 is a diagram of an example control subfield 1200 that includes UL MU response scheduling information, according to yet another embodiment. The control subfield 1200 generally corresponds to the control subfield 1100, but includes the control ID subfield 1102, the UL PPDU length subfield 1104, the DL transmission power subfield 1106, the target UL reception power subfield 1108, the RU allocation subfield 1110, and optionally the MCS subfield 1152.

FIG. 13A and FIG. 13B are diagrams of example control subfields 1300 and 1350 that include UL MU response scheduling information for either an UL MU-MIMO transmission (1300) or a non-MU-MIMO transmission (1350). The control subfield 1300 and control subfield 1350 each include the control ID subfield 1102 and a MU-MIMO indicator subfield 1302. The MU-MIMO indicator subfield 1302 indicates whether the remaining fields correspond to the control subfield 1300 or the control subfield 1350. For example, a value of 1 corresponds to the control subfield 1300 and a value of 0 corresponds to the control subfield 1350. The control subfield 1300 further includes the UL PPDU length subfield 1104, the DL transmission power subfield 1106, the target UL reception power subfield 1108, the start spatial stream subfield 1112, and optionally the MCS subfield 1152. The control subfield 1350 further includes the UL PPDU length subfield 1104, the DL transmission power subfield 1106, the target UL reception power subfield 1108, the RU allocation subfield 1110, and optionally the MCS subfield 1152.

Figure 14:
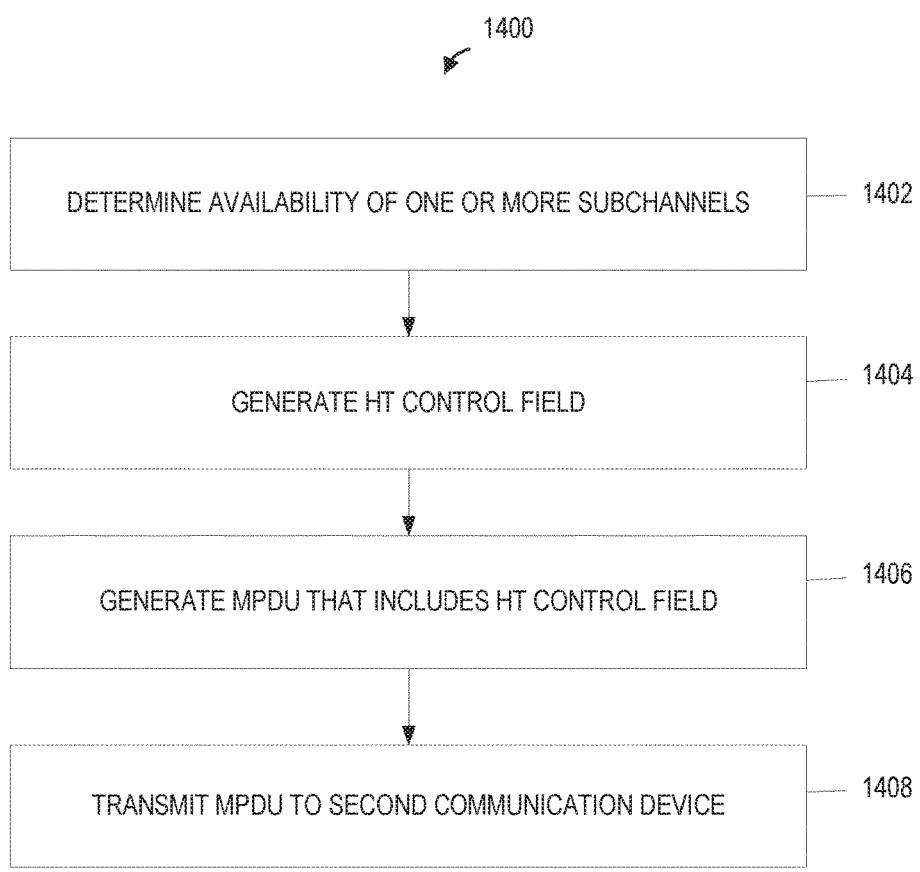
FIG. 14 is a flow diagram of an example method of transmitting a subchannel availability for an UL MU transmission, according to an embodiment.

FIG. 14 is a flow diagram of an example method 1400 for transmitting a subchannel availability for an UL MU transmission (e.g., UL OFDMA data unit 558), according to an embodiment. In some embodiments, the network interface device 162 of FIG. 1 is configured to implement the method 1400. The method 1400 is described, however, in the context of the network interface device 162 merely for explanatory purposes and, in other embodiments, the method 1400 is implemented by another suitable device, for example, the network interface device 122.

At block 1402, the network interface device 162 determines an availability of one or more subchannels of an OFDM channel for the UL MU transmission. For example, the network interface device 162 utilizes a carrier sense (CS) mechanism to determine whether the subchannels are busy or idle.

At block 1404, the network interface device 162 generates a High Throughput (HT) Control field of a media access control (MAC) header that includes an indication of the determined availability of the one or more subchannels. For example, the network interface device 162 generates the HT Control field 414 with the control subfield 500. In an embodiment, the control subfield 500 includes the indication of availability of the one or more subchannels as a bitmap having one bit per subchannel of the one or more subchannels, for example, the subchannel bitmap subfield 504. In an embodiment, the HT Control field further includes buffer information corresponding to MPDUs that are queued for transmission by the network interface device 162. In an embodiment, the HT Control field is an HE variant HT Control field.

At block 1406, the network interface device 162 generates a MAC protocol data unit (MPDU) that includes the HT Control field. For example, the network interface device 162 generates the MPDU 400 to include the HT Control field 414 with the control subfield 500. In an embodiment, the network interface device 162 generates a QoS Control field (e.g., QoS Control field 412) for the MPDU that includes buffer information corresponding to MPDUs that are queued for transmission by the network interface device 162.

At block 1408, the network interface device 162 transmits the MPDU to a second communication device via the OFDM channel for a subsequent allocation of radio resources for the UL MU transmission by the second communication device. For example, the network interface device 162 transmits the MPDU 400 to the AP 114.

In an embodiment, the network interface device 162 transmits the MPDU in response to a first trigger frame (e.g., DL OFDM data unit 552) received from the second communication device. The network interface device 162 receives a second trigger frame (e.g., DL OFDM data unit 556) that includes an indication of an allocation of radio resources for the UL MU transmission by the second communication device. The network interface device 162 generates an OFDM data unit (e.g., one of OFDM data units 558-1, 558-2, or 558-3) of the UL MU transmission. The network interface device 162 transmits the OFDM data unit using the allocation of radio resources.

Figure 15:
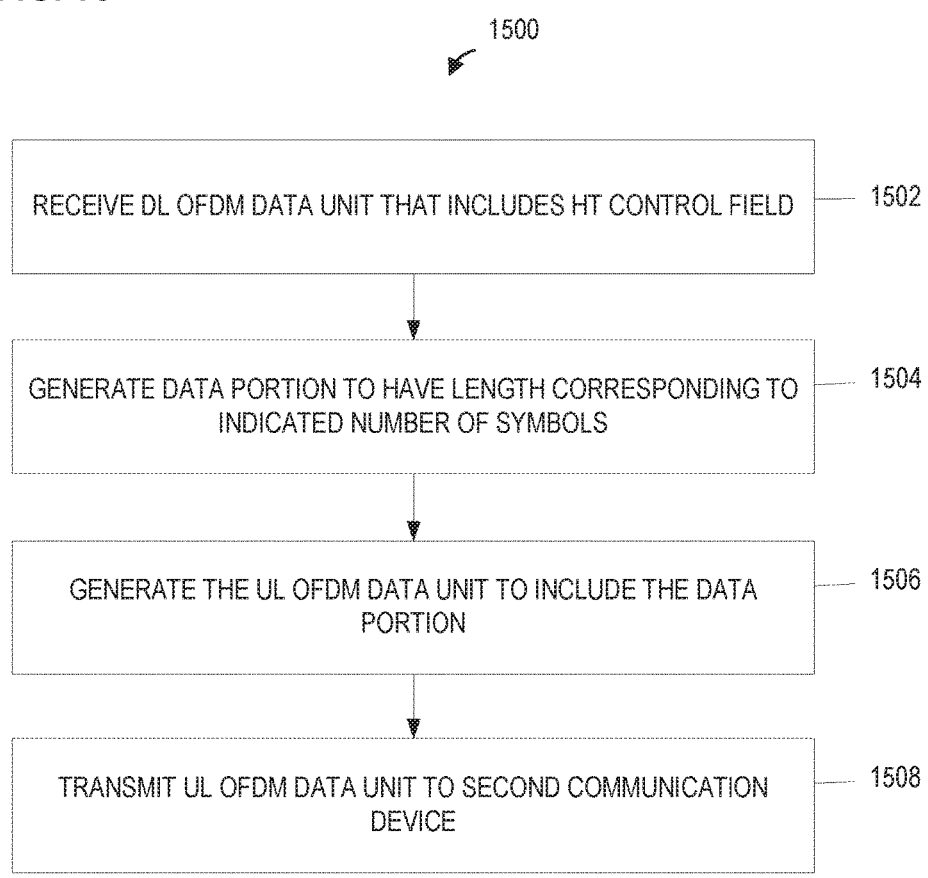
FIG. 15 is a flow diagram of an example method of transmitting an UL OFDM data unit of an UL MU transmission, according to an embodiment.

FIG. 15 is a flow diagram of an example method 1500 for transmitting an UL OFDM data unit of an UL MU transmission, according to an embodiment. In some embodiments, the network interface device 162 of FIG. 1 is configured to implement the method 1500. The method 1500 is described, however, in the context of the network interface device 162 merely for explanatory purposes and, in other embodiments, the method 1500 is implemented by another suitable device, for example, the network interface device 122.

At block 1502, the network interface device 162 receives, from a second communication device (e.g., AP 114), a DL OFDMA or DL MU MIMO data unit that includes a High Throughput (HT) Control field of a media access control (MAC) header, the HT Control field including an indication of the number of OFDM symbols for a portion of the UL MU OFDM data unit. For example, the indication of the number of OFDM symbols of UL PPDU data portion is the UL PPDU length subfield 1104 of the control subfield 1100, 1150, 1200, 1300, or 1350.

In an embodiment, the HT Control field is an HE variant HT Control field and further includes a radio resource allocation field (e.g., RU allocation subfield 1110) that indicates an allocation of radio resources for the OFDM data unit of the UL MU transmission. The network interface device 162 transmits the UL OFDM data unit comprises transmitting the UL OFDM data unit using the allocation of radio resources.

In an embodiment, the HT Control field is a HE variant HT Control field and further includes i) a DL transmission power field (e.g., DL transmission power subfield 1106) that indicates a transmission power with which the DL OFDM data unit was transmitted, and ii) a target UL reception power field (e.g., target UL reception power subfield 1108) that indicates a desired reception power of the UL OFDM data unit by the second communication device. In this embodiment, the network interface device 162 estimates a path loss, determines an UL transmission power corresponding to the desired reception power based on the estimated path loss, and transmits the UL OFDM data unit with the determined UL transmission power, as described above with respect to FIG. 11A.

In an embodiment, the HT Control field is a HE variant HT Control field and further includes a modulation and coding scheme (MCS) field (e.g., MCS subfield 1152) that indicates the MCS to be used for the UL OFDM data unit. The network interface device 162 prepares the UL MU acknowledgment frame with the indicated MCS.

At block 1504, the network interface device 162 generates the PHY data portion to have a length corresponding to the indicated number of OFDM symbols.

At block 1506, the network interface device 162 generates the UL OFDM data unit to include the PHY data portion.

At block 1508, the network interface device 162 transmits the UL OFDM data unit to the second communication device.

Further aspects of the present invention relate to one or more of the following clauses.

In an embodiment, a method for transmitting a subchannel availability for an uplink (UL) multi-user (MU) transmission includes: determining, by a first communication device, an availability of one or more subchannels of an orthogonal frequency division multiplex (OFDM) channel for the UL MU transmission; generating, by the first communication device, a High Throughput (HT) Control field of a media access control (MAC) header that includes an indication of the determined availability of the one or more subchannels; generating, by the first communication device, a MAC protocol data unit (MPDU) that includes the HT Control field; and transmitting, by the first communication device, the MPDU to a second communication device via the OFDM channel for a subsequent allocation of radio resources for the UL MU transmission by the second communication device.

In other embodiments, the method includes any suitable combination of one or more of the following features.

The indication of availability of the one or more subchannels is a bitmap having one bit per subchannel of the one or more subchannels.

The HT Control field further includes buffer information corresponding to MPDUs that are queued for transmission by the first communication device.

The method further includes generating, by the first communication device, a Quality of Service (QoS) Control field that includes buffer information corresponding to MPDUs that are queued for transmission by the first communication device.

The HT Control field is a high efficiency (HE) variant HT Control field.

The HE variant HT Control field includes i) a control ID subfield that indicates that the HE variant HT Control field includes the buffer information, and ii) a status report subfield that indicates the number of bytes for the MPDUs that are queued for transmission.

Transmitting the MPDU to the second communication device includes transmitting the MPDU in response to a first trigger frame received from the second communication device, and the method further includes: receiving, by the first communication device and from the second communication device, a second trigger frame that includes an indication of an allocation of radio resources for the UL MU transmission by the second communication device; generating, by the first communication device, an OFDM data unit of the UL MU transmission; and transmitting, by the first communication device and to the second communication device, the OFDM data unit using the allocation of radio resources.

In another embodiment, an apparatus for transmitting a subchannel availability for an uplink (UL) multi-user (MU) transmission includes a network interface device associated with a first communication device and having one or more integrated circuits (ICs) configured to: determine an availability of one or more subchannels of an orthogonal frequency division multiplex (OFDM) channel for the UL MU transmission; generate a High Throughput (HT) Control field of a media access control (MAC) header that includes an indication of the determined availability of the one or more subchannels; generate a MAC protocol data unit (MPDU) that includes the HT Control field; and transmit the MPDU to a second communication device via the OFDM channel for a subsequent allocation of radio resources for the UL MU transmission by the second communication device.

In other embodiments, the apparatus includes any suitable combination of one or more of the following features.

The indication of availability of the one or more subchannels is a bitmap having one bit per subchannel of the one or more subchannels.

The HT Control field further includes buffer information corresponding to MPDUs that are queued for transmission by the first communication device.

The one or more ICs are further configured to generate a Quality of Service (QoS) Control field that includes buffer information corresponding to MPDUs that are queued for transmission by the first communication device.

The HT Control field is a high efficiency (HE) variant HT Control field.

The HE variant HT Control field includes i) a control ID subfield that indicates that the HE variant HT Control field includes the buffer information, and ii) a status report subfield that indicates the number of bytes for the MPDUs that are queued for transmission.

The one or more ICs are further configured to: transmit the MPDU in response to a first trigger frame received from the second communication device; receive, from the second communication device, a second trigger frame that includes an indication of an allocation of radio resources for the UL MU transmission by the second communication device; generate an OFDM data unit of the UL MU transmission; and transmit, to the second communication device, the OFDM data unit using the allocation of radio resources.

In an embodiment, a method for transmitting an uplink (UL) orthogonal frequency division multiplex (OFDM) data unit of an UL multi-user (MU) transmission includes: receiving, by a first communication device and from a second communication device, a downlink (DL) OFDM data unit that includes a High Throughput (HT) Control field of a media access control (MAC) header, the HT Control field including an indication of a number of OFDM symbols for a data portion of the UL OFDM data unit; generating, by the first communication device, the data portion of the UL OFDM data unit to have a length corresponding to the indicated number of OFDM symbols; generating the UL OFDM data unit to include the data portion; and transmitting, by the first communication device, the UL OFDM data unit to the second communication device.

In other embodiments, the method includes any suitable combination of one or more of the following features.

The HT Control field is a high efficiency (HE) variant HT Control field and further includes a radio resource allocation field that indicates an allocation of radio resources for the OFDM data unit of the UL MU transmission. Transmitting the UL OFDM data unit includes transmitting the UL OFDM data unit using the allocation of radio resources.

The HT Control field is a HE variant HT Control field and further includes i) a DL transmission power field that indicates a transmission power with which the DL OFDM data unit was transmitted, and ii) a target UL reception power field that indicates a desired reception power of the UL OFDM data unit by the second communication device. The method further includes: estimating a path loss between the first communication device and the second communication device; determining an UL transmission power corresponding to the desired reception power based on the estimated path loss; and transmitting the UL OFDM data unit with the determined UL transmission power.

The HT Control field is a HE variant HT Control field and further includes a modulation and coding scheme (MCS) field that indicates the MCS to be used for the UL OFDM data unit. The method further includes encoding the data portion with the indicated MCS.

In another embodiment, an apparatus for transmitting an uplink (UL) orthogonal frequency division multiplex (OFDM) data unit of an UL multi-user (MU) transmission includes a network interface device associated with a first communication device and having one or more integrated circuits (ICs) configured to: receive, from a second communication device, a downlink (DL) OFDM data unit that includes a High Throuhput (HT) Control field of a media access control (MAC) header, the HT Control field including an indication of a number of OFDM symbols for a portion of the UL OFDM data unit; generate the data portion to have a length corresponding to the indicated number of OFDM symbols; generate the UL OFDM data unit to include the data portion; and transmit the UL OFDM data unit to the second communication device.

In other embodiments, the apparatus includes any suitable combination of one or more of the following features.

The HT Control field is a high efficiency (HE) variant HT Control field and further includes a radio resource allocation field that indicates an allocation of radio resources for the OFDM data unit of the UL MU transmission. The one or more ICs are further configured to transmit the UL OFDM data unit using the allocation of radio resources.

The HT Control field is a HE variant HT Control field and further includes i) a DL transmission power field that indicates a transmission power with which the DL OFDM data unit was transmitted, and ii) a target UL reception power field that indicates a desired reception power of the UL OFDM data unit by the second communication device. The one or more ICs are further configured to: estimate a path loss between the first communication device and the second communication device; determine an UL transmission power corresponding to the desired reception power based on the estimated path loss; and transmit the UL OFDM data unit with the determined UL transmission power.

The HT Control field is a HE variant HT Control field and further includes a modulation and coding scheme (MCS) field that indicates the MCS to be used for the UL OFDM data unit. The one or more ICs are further configured to encode the data portion with the indicated MCS.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for transmitting a subchannel availability for an uplink (UL) multi-user (MU) transmission, the method comprising:
   determining, by a client station of a wireless local area network (WLAN), an availability at the client station of one or more subchannels of an orthogonal frequency division multiplex (OFDM) channel for the UL MU transmission;
   generating, by the client station, a High Throughput (HT) Control field of a media access control (MAC) header that includes an indication of the determined availability of the one or more subchannels;
   generating, by the client station, a MAC protocol data unit (MPDU) that includes the HT Control field; and
   transmitting, by the client station, the MPDU to an access point of the WLAN via the OFDM channel for a subsequent allocation of radio resources for the UL MU transmission by the access point based on the indication.

2. The method of claim 1, wherein the indication of availability of the one or more subchannels is a bitmap having one bit per subchannel of the one or more subchannels.

3. The method of claim 1, wherein the HT Control field further includes buffer information corresponding to MPDUs that are queued for transmission by the client station.

4. The method of claim 1, the method further comprising: generating, by the client station, a Quality of Service (QoS) Control field that includes buffer information corresponding to MPDUs that are queued for transmission by the client station.

5. The method of claim 1, wherein the HT Control field is a high efficiency (HE) variant HT Control field.

6. The apparatus of claim 5, wherein the HE variant HT Control field includes i) a control ID subfield that indicates that the HE variant HT Control field includes the buffer information, and ii) a status report subfield that indicates the number of bytes for the MPDUs that are queued for transmission.

7. The method of claim 1, wherein:
   transmitting the MPDU to the access point comprises transmitting the MPDU in response to a first trigger frame received from the access point;
   the method further comprises:
       receiving, by the client station and from the access point, a second trigger frame that includes an indication of an allocation of radio resources for the UL MU transmission by the access point,
       generating, by the client station, an OFDM data unit of the UL MU transmission,
       transmitting, by the client station and to the access point, the OFDM data unit using the allocation of radio resources.

8. An apparatus for transmitting a subchannel availability for an uplink (UL) multi-user (MU) transmission, the apparatus comprising:
a network interface device associated with a client station, wherein the network interface device includes one or more integrated circuits (ICs) configured to:
determine an availability of one or more subchannels of an orthogonal frequency division multiplex (OFDM) channel for the UL MU transmission;
generate a High Throughput (HT) Control field of a media access control (MAC) header that includes an indication of the determined availability of the one or more subchannels;
generate a MAC protocol data unit (MPDU) that includes the HT Control field; and
transmit the MPDU to an access point via the OFDM channel for a subsequent allocation of radio resources for the UL MU transmission by the access point.

9. The apparatus of claim 8, wherein the indication of availability of the one or more subchannels is a bitmap having one bit per subchannel of the one or more subchannels.

10. The apparatus of claim 8, wherein the HT Control field further includes buffer information corresponding to MPDUs that are queued for transmission by the client station.

11. The apparatus of claim 8, wherein the one or more ICs are further configured to generate a Quality of Service (QoS) Control field that includes buffer information corresponding to MPDUs that are queued for transmission by the client station.

12. The apparatus of claim 8, wherein the HT Control field is a high efficiency (HE) variant HT Control field.

13. The apparatus of claim 12, wherein the HE variant HT Control field includes i) a control ID subfield that indicates that the HE variant HT Control field includes the buffer information, and ii) a status report subfield that indicates the number of bytes for the MPDUs that are queued for transmission.

14. The apparatus of claim 8, wherein the one or more ICs are further configured to:
transmit the MPDU in response to a first trigger frame received from the access point;
receive, from the access point, a second trigger frame that includes an indication of an allocation of radio resources for the UL MU transmission by the access point;
generate an OFDM data unit of the UL MU transmission; and
transmit, to the access point, the OFDM data unit using the allocation of radio resources.

15. A method for transmitting an uplink (UL) orthogonal frequency division multiplex (OFDM) physical layer protocol data unit (PPDU) of an UL multi-user (MU) transmission, the method comprising:
receiving, by a client station and from an access point, a downlink (DL) OFDM PPDU that includes a High Throughput (HT) Control field of a media access control (MAC) header, the HT Control field including an indication of a number of OFDM symbols for a data portion of the UL MU OFDM PPDU;
generating, by the client station, the data portion of the UL OFDM PPDU to have a length corresponding to the indicated number of OFDM symbols;
generating the UL OFDM PPDU to include the data portion; and
transmitting, by the client station, the UL OFDM data unit PPDU to the access point.

16. The method of claim 15, wherein:
the HT Control field is a high efficiency (HE) variant HT Control field and further includes a radio resource allocation field that indicates an allocation of radio resources for the OFDM PPDU of the UL MU transmission; and
transmitting the UL OFDM PPDU comprises transmitting the UL OFDM PPDU using the allocation of radio resources.

17. The method of claim 15, wherein:
the HT Control field is a HE variant HT Control field and further includes i) a DL transmission power field that indicates a transmission power with which the DL OFDM PPDU was transmitted, and ii) a target UL reception power field that indicates a desired reception power of the UL OFDM PPDU by the access point;
the method further comprises:
estimating a path loss between the client station and the access point,
determining an UL transmission power corresponding to the desired reception power based on the estimated path loss, and
transmitting the UL OFDM PPDU with the determined UL transmission power.

18. The method of claim 15, wherein:
the HT Control field is a HE variant HT Control field and further includes a modulation and coding scheme (MCS) field that indicates the MCS to be used for the UL OFDM PPDU;
the method further comprises encoding the data portion with the indicated MCS.

19. An apparatus for transmitting an uplink (UL) orthogonal frequency division multiplex (OFDM) physical layer protocol data unit (PPDU) of an UL multi-user (MU) transmission, the apparatus comprising:
a network interface device associated with a client station, wherein the network interface device includes one or more integrated circuits (ICs) configured to:
receive, from an access point, a downlink (DL) OFDM PPDU that includes a High Throughput (HT) Control field of a media access control (MAC) header, the HT Control field including an indication of a number of OFDM symbols for a data portion of the UL OFDM PPDU;
generate the data portion to have a length corresponding to the indicated number of OFDM symbols;
generate the UL OFDM PPDU to include the data portion; and
transmit the UL OFDM PPDU to the access point.

20. The apparatus of claim 19, wherein:
the HT Control field is a high efficiency (HE) variant HT Control field and further includes a radio resource allocation field that indicates an allocation of radio resources for the OFDM PPDU of the UL MU transmission; and
the one or more ICs are further configured to transmit the UL OFDM PPDU using the allocation of radio resources.

21. The apparatus of claim 19, wherein:
the HT Control field is a HE variant HT Control field and further includes i) a DL transmission power field that indicates a transmission power with which the DL OFDM PPDU was transmitted, and ii) a target UL reception power field that indicates a desired reception power of the UL OFDM PPDU by the access point;

the one or more ICs are further configured to
   estimate a path loss between the client station and the access point,
   determine an UL transmission power corresponding to the desired reception power based on the estimated path loss, and
   transmit the UL OFDM PPDU with the determined UL transmission power.

22. The apparatus of claim 19, wherein:
the HT Control field is a HE variant HT Control field and further includes a modulation and coding scheme (MCS) field that indicates the MCS to be used for the UL OFDM PPDU;
the one or more ICs are further configured to encode the data portion with the indicated MCS.

* * * * *